United States Patent
Kuriya et al.

(10) Patent No.: US 7,272,859 B2
(45) Date of Patent: Sep. 18, 2007

(54) INFORMATION PROVIDING DEVICE AND METHOD

(75) Inventors: Shinobu Kuriya, Chiba (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 10/048,164

(22) PCT Filed: May 29, 2001

(86) PCT No.: PCT/JP01/04507

§ 371 (c)(1),
(2), (4) Date: May 6, 2002

(87) PCT Pub. No.: WO01/93136

PCT Pub. Date: Dec. 6, 2001

(65) Prior Publication Data

US 2002/0152381 A1   Oct. 17, 2002

(30) Foreign Application Priority Data

May 29, 2000   (JP) .............................. 2000-158547

(51) Int. Cl.
  *G06F 11/14*   (2006.01)
  *G06F 15/173*  (2006.01)
  *H04L 12/00*   (2006.01)
(52) U.S. Cl. .................. 726/29; 370/254; 709/223; 714/4
(58) Field of Classification Search .................. 725/25, 725/30, 31; 726/28, 29
See application file for complete search history.

(56) References Cited

U.S. PATENT DOCUMENTS

| 5,138,712 | A  | * | 8/1992  | Corbin ........................ 726/30 |
| 5,745,879 | A  | * | 4/1998  | Wyman ........................ 705/1 |
| 5,977,971 | A  |   | 11/1999 | Guzak et al. |
| 6,189,146 | B1 | * | 2/2001  | Misra et al. ................. 717/177 |
| 6,229,538 | B1 | * | 5/2001  | McIntyre et al. ........... 715/734 |
| 6,272,537 | B1 | * | 8/2001  | Kekic et al. ................. 709/223 |
| 6,363,411 | B1 | * | 3/2002  | Dugan et al. ............... 709/202 |
| 6,366,953 | B2 | * | 4/2002  | Inoue ........................ 709/219 |

FOREIGN PATENT DOCUMENTS

| EP | 0 715 244 | 6/1996 |
| EP | 0715241   | 6/1996 |
| JP | 7-104993  | 4/1995 |
| JP | 8-305714  | 11/1996 |

(Continued)

OTHER PUBLICATIONS

"SDMI Portable Device Specification", SDMI, Part 1, Version 1.0, XP-000997330, Jul. 8, 1999, pp. 1-35.

*Primary Examiner*—Matthew Heneghan
(74) *Attorney, Agent, or Firm*—Oblon, Spivak, McClelland, Maier & Neustadt, P.C.

(57) ABSTRACT

An authentication function authenticates a PDA. The content database holds the usage conditions of a content and the information about the content. The communication function controls the reception of the usage conditions and the content information, both transmitted from the PDA. The content management function updates the usage conditions and the content information received, on the basis of the usage conditions and the content information held. The desired content is thereby retrieved quickly.

11 Claims, 31 Drawing Sheets

FOREIGN PATENT DOCUMENTS

| | | |
|---|---|---|
| JP | 10-269144 | 10/1998 |
| JP | 11-149403 | 6/1999 |
| JP | 11-259964 | 9/1999 |
| JP | 11-345261 | 12/1999 |
| JP | 2000-82003 | 3/2000 |
| WO | WO 00/08909 | 2/2000 |
| WO | WO 0008909 A2 * | 2/2000 |

* cited by examiner

| CONTENT ID | DEVICE ID | ADDITIONAL DATA | | | USAGE CONDITIONS | | | | FILE NAME |
|---|---|---|---|---|---|---|---|---|---|
| | | NAME | RECORDING DATE | AUTHORIZED USER | COPY COUNT | TRANSFER COUNT | REPRODUCTION COUNT | | |
| AAA | DDD | 111 | YYMMDD | UUU | 0 | 3 | 10 | | ¥ROOT¥ AUDIO¥audio1 |
| BBB | ddd | 222 | yymmdd | uuu | 0 | 3 | 10 | | ¥ROOT¥ AUDIO¥audio2 |

FIG.5

| CONTENT ID | DEVICE ID | CONNECTION STATE | ADDITIONAL DATA | | AUTHORIZED USER | USAGE CONDITIONS | | | FILE NAME |
|---|---|---|---|---|---|---|---|---|---|
| | | | NAME | RECORDING DATE | | COPY COUNT | TRANSFER COUNT | REPRODUCTION COUNT | |
| AAA | DDD | false | 111 | YYMMDD | UUU | 0 | 3 | 10 | ¥ROOT¥ AUDIO¥audio1 |
| BBB | ddd | false | 222 | yymmdd | uuu | 0 | 3 | 10 | ¥ROOT¥ AUDIO¥audio2 |

FIG.15

| DEVICE CONNECTED | CONTENT ID | DEVICE ID | DEVICE NAME | INFORMATION ACCESSED | ADDITIONAL DATA | | | | USAGE CONDITIONS | | | | FILE NAME | DATA DISPLAYED |
|---|---|---|---|---|---|---|---|---|---|---|---|---|---|---|
| | | | | | NAME | RECORDING DATE | TYPE OF CONTENT | AUTHORIZED USER | COPY COUNT | TRANSFER COUNT | REPRODUCTION COUNT | | | |
| null | 0001 | 0001 | SERVER | TRUE | MUSIC A | 2000/1/15 | mp3 | paul | 0 | 3 | 10 | | ¥ROOT¥AUDIO¥audio1 | aaa bbb... |
| 0001 | 0002 | 0002 | PC | TRUE | MUSIC B | 2000/2/5 | mp3 | paul | 0 | 3 | 10 | | ¥ROOT¥AUDIO¥audio2 | ccc ddd... |
| 0001 | 0003 | 0002 | PC | TRUE | IMAGE C | 2000/8/30 | jpeg | paul | 1 | 3 | 10 | | ¥ROOT¥IMAGE¥image1 | eee fff... |
| 0002 | 0004 | 0003 | HARD DISC DRIVE | TRUE | MUSIC D | 2000/9/15 | at3 | kevin | 2 | 2 | 20 | | ¥ROOT¥AUDIO¥audio3 | ggg hhh... |
| 0001 | 0005 | 0004 | PDA | FALSE | IMAGE E | 2000/6/1 | gif | jamie | 5 | 4 | 50 | | ¥ROOT¥IMAGE¥image2 | iii jjj... |

FIG.22

| DEVICE CONNECTED | CONTENT ID | DEVICE ID | DEVICE NAME | INFORMATION ACCESSED | ADDITIONAL DATA ||||| USAGE CONDITIONS ||| FILE NAME | DATA DISPLAYED |
| --- | --- | --- | --- | --- | --- | --- | --- | --- | --- | --- | --- | --- | --- |
| | | | | | NAME | RECORDING DATE | TYPE OF CONTENT | AUTHORIZED USER | COPY COUNT | TRANSFER COUNT | REPRODUCTION COUNT | | |
| null | 0001 | 0001 | SERVER | TRUE | MUSIC A | 2000/1/15 | mp3 | paul | 0 | 3 | 10 | ¥ROOT¥AUDIO¥audio1 | aaa bbb... |
| 0001 | 0002 | 0002 | PC | TRUE | MUSIC B | 2000/2/5 | mp3 | paul | 0 | 3 | 10 | ¥ROOT¥AUDIO¥audio2 | ccc ddd... |
| 0002 | 0004 | 0003 | HARD DISC DRIVE | TRUE | MUSIC D | 2000/9/15 | at3 | kevin | 2 | 2 | 20 | ¥ROOT¥AUDIO¥audio3 | ggg hhh... |
| 0002 | 0003 | 0003 | HARD DISC DRIVE | TRUE | IMAGE C | 2000/8/30 | jpeg | paul | 1 | 3 | 10 | ¥ROOT¥IMAGE¥image1 | eee fff... |
| 0001 | 0005 | 0004 | PDA | FALSE | IMAGE E | 2000/6/1 | gif | jamie | 5 | 4 | 50 | ¥ROOT¥IMAGE¥image2 | iii jjj... |

FIG.25

INFORMATION PROVIDING DEVICE AND METHOD

TECHNICAL FIELD

The present invention relates to an information providing apparatus, an information providing method, an information processing device, an information processing method, and a recording medium. More particularly, the invention relates an information providing apparatus, an information providing method, an information processing device, an information processing method, and a recording medium, for manipulating content the operation on which is restricted by the usage conditions.

BACKGROUND ART

As digital devices including computers have become more advanced, digital content (hereafter simply referred to as content) of such as music and images has come to be handled.

Generally, content is stored in a directory structure on a storage unit arranged internal or external to a digital device. Content can be attached with additional information such as its name, recording date, and information indicative whether the content is read only or not.

Executing a predetermined program, the personal computer can easily execute content retrieval, movement, and copy for example. For example, Internet Explorer (trademark) (produced by Microsoft Corporation) displays content in a tree structure. If plural digital devices are connected to the personal computer which executes Internet Explorer, it can display all content stored in all the connected devices.

Internet Explorer displays types of content with icons. Also, when an icon representing a particular piece of content has been dragged and dropped, Internet Explorer copies or moves that content accordingly.

Thus, the content movement and copy operations can be executed easily, thereby causing problems associated with content copyright protection.

To solve the problems, copyright protection technologies are used by which content is encrypted and content usage conditions and a content key for content encryption (or decryption) are attached to the encrypted content.

The content usage conditions include reproduction count, reproduction period, movement count, copy count, and checkout count for example. The copyright protection technologies become available only when the encrypted content attached with its usage conditions and content key and a device compatible with a particular copyright protection technology are ready for use.

One of the problems involved in the related art is that copyright-protected content cannot be moved or copied unless a procedure based on a particular copyright protection technology is followed. The related-art technologies are unable to move or copy any copyright-protected content without requiring users to execute cumbersome operations.

Another problem is that, as the number of content handling devices and the volume of content increases, it becomes more difficult for users to retrieve desired pieces of content.

DISCLOSURE OF THE INVENTION

The present invention has been made in view of the foregoing. An object of the invention is to enable users to promptly retrieve desired content, to move easily or copy copyright-protected content in accordance with their usage conditions.

An information providing apparatus according to the present invention comprises: apparatus authentication means for authenticating a first information processing device though a transmission path; holding means for holding the usage conditions of content and the information about the content; first reception control means for controlling the reception of the usage conditions transmitted from the first information processing device and the reception of the information about the content; and updating means for updating the usage conditions and the information, held in the holding means, on the basis of the usage conditions and the information which have been received.

The information providing apparatus may further comprises transmission control means for controlling the transmission of the information to a second information processing device if the information has been updated.

The information providing apparatus may further comprise display control means for controlling the displaying of the information associated with the content.

The information providing apparatus may further comprise a second reception control means for controlling the reception of a content operation request transmitted from the first information processing device; and transmission control means for controlling the transmission of the content operation request to the second information processing device.

The information providing apparatus may further comprise means for determining whether to permit an operation of the content, in accordance with the usage conditions held; and operating means for operating the content if it has been determined that the operation of the content is permitted.

The information providing apparatus may further comprise user authentication means for authenticating a user of the information providing apparatus.

In the information providing apparatus, the holding means further holds a flag indicating whether or not the first information processing device is connected to the information providing apparatus. The updating means can update the flag.

An information providing method according to the invention comprises the steps of: authenticating an information processing device through a transmission path; holding the usage conditions of content and the information about the content; controlling the reception of the usage conditions and the reception of the information about the content; and updating the usage conditions and the information, which have been held, on the basis of the usage conditions and the information which have been received.

A recording medium according to the invention records a program describing the steps of: authenticating an information processing device though a transmission path; holding the usage conditions of content and the information about the content; controlling the reception of the usage conditions and the reception of the information about the content; and updating the usage conditions and the information, which have been held, on the basis of the usage conditions and the information which have been received.

An information processing device according this invention comprises: holding means for holding the usage conditions of content and the information associated with the content; first updating means for updating the usage conditions and the information, held in the holding means, in accordance with the operation of the content if the content have been operated; apparatus authentication means for authenticating an information providing apparatus though a transmission path; first transmission control means for controlling the transmission of the usage conditions and the information to the information providing apparatus when the content are operated; reception control means for controlling the reception of the usage conditions and the information associated with the content, which have been transmitted from the information providing apparatus; second updating means for updating the usage conditions and the information, both held, on the basis of the usage conditions and the information which have been received; and display control means for controlling the displaying of the information.

The information processing device may further comprise means for determining whether to permit an operation of the content, in accordance with the usage conditions held; and operating means for operating the content if it has been determined that the operation of the content is permitted.

The information processing device may further comprise user authentication means for authenticating a user of the information processing device.

The information processing device may further comprise second transmission control means for controlling the transmission of a content operation request to the second information providing apparatus.

An information processing method according this invention comprises: a holding step of holding the usage conditions of content and the information associated with the content; a first updating step of updating the usage conditions and the information, held in the holding means, in accordance with the operation of the content if the content have been operated; an apparatus authentication step of authenticating an information providing apparatus though a transmission path; a transmission control step of controlling the transmission of the usage conditions and the information to the information providing apparatus when the content are operated; a reception control step of controlling the reception of the usage conditions and the information associated with the content, which have been transmitted from the information providing apparatus; a second updating step of updating the usage conditions and the information, both held, on the basis of the usage conditions and the information which have been received; and a display control step of controlling the displaying of the information.

A recording medium according this invention records a program which describes: a holding step of holding the usage conditions of content and the information associated with the content; a first updating step of updating the usage conditions and the information, held in the holding means, in accordance with the operation of the content if the content have been operated; an apparatus authentication step of authenticating an information providing apparatus though a transmission path; a transmission control step of controlling the transmission of the usage conditions and the information to the information providing apparatus when the content are operated; a reception control step of controlling the reception of the usage conditions and the information associated with the content, which have been transmitted from the information providing apparatus; a second updating step of updating the usage conditions and the information, both held, on the basis of the usage conditions and the information which have been received; and a display control step of controlling the displaying of the information.

In the information providing apparatus, information providing method and recording medium according to the invention, an information processing device is authenticated though the transmission path. The usage conditions of the content and the information associated with the content are held. The reception of the usage conditions of content and the information associated with the content, all transmitted from the information processing device, is controlled. The usage conditions and the information, both held, are updated based on the usage conditions and the information received.

In the information processing device, information processing method and recording medium according to the invention, the usage conditions of content and the information associated with the content are held. When the content are operated, the usage conditions and the information, all held are updated in accordance with the operation of the content. An information providing apparatus is authenticated through the transmission path. The transmission of the usage conditions and the information associated with the content, to the information providing apparatus, is controlled when the content is operated. The reception of the usage conditions and the information associated with the content, transmitted from the information providing apparatus, is controlled. The usage conditions and the information, all held, are updated based on the usage conditions and the information received.

BRIEF DESCRIPTION OF THE DRAWINGS

FIG. 5 is a diagram illustrating an example of content, which a content database 224 records;

FIG. 15 is a diagram illustrating an example of content, which a content database 102 records;

FIG. 22 is a diagram illustrating an example of the content data;

FIG. 25 is a diagram depicting another example of the content data;

BEST MODE FOR CARRYING OUT THE INVENTION

Figure 1:
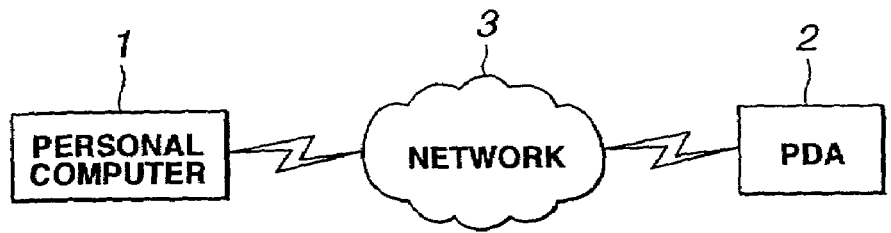
FIG. 1 is a diagram showing a content display system according to an embodiment of the present invention.

This invention will be described in further detail by way of example with reference to the accompanying drawings. Now, referring to FIG. 1, there is shown one embodiment of a content display system associated with the present invention. A personal computer 1 is connected to a PDA (Personal Digital Assistant) 2 via a network 3 compliant with the IEEE (Institute of Electrical and Electronic Engineers) 1394 or constituted by a USB (Universal Serial Bus) for example.

The personal computer 1 records content such as music or moving or still image along with its additional information (for example, content name, content recording date, and content copyright holder), its usage conditions (for example, the number of time the content can be reproduced, the data indicating whether the content can be moved or not or copied or not, and the number of times the content can be checked out) and a content key. Content is encrypted by DES (Data Encryption Standard) for example.

On the basis of a user HD or a password stored in advance, the personal computer 1 authenticates its user. By use of an authentication key for example stored in advance, the personal computer 1 authenticates the PDA 2 via a network 3.

The personal computer 1 receives the additional information and usage conditions of a particular piece of content from the PDA 2 via the network 3 and displays the received additional information and usage conditions.

The personal computer 1 sends the additional information and usage conditions of the content stored in itself to the PDA 2 via the network 3.

On the basis of the usage conditions of the content stored in itself or the usage conditions (recorded in the personal computer 1) of the content stored in the PDA 2, the personal computer 1 moves or copies the content stored in itself or the PDA 2 as instructed by the user.

On the basis of the content usage conditions of the content stored in itself, the personal computer 1 decodes the content stored in itself and reproduces the decoded content as instructed by the user.

The usage conditions includes content reproduction, movement, and copy conditions and authorized users.

The PDA 2 stores content along with its additional information, usage conditions, and content key.

The PDA 2 authenticates the user of the PDA 2. The PDA 2 authenticates the personal computer 1 via the network 3.

The PDA 2 receives the additional information and usage conditions of the content stored in the personal computer 1 therefrom via the network 3 and displays the received additional information and usage conditions.

The PDA 2 sends the additional information and usage conditions of the content stored in itself to the personal computer 1 via the network 3.

On the basis of the usage conditions of the content stored in itself or the usage conditions (stored in the PDA 2) of the content recorded in the personal computer 1, the PDA 2 moves or copies the content recorded in the personal computer 1 or the PDA 2 as instructed by the user.

On the basis of the usage conditions of the content stored in itself, the PDA 2 reproduces the content stored in itself as instructed by the user.

Figure 2:
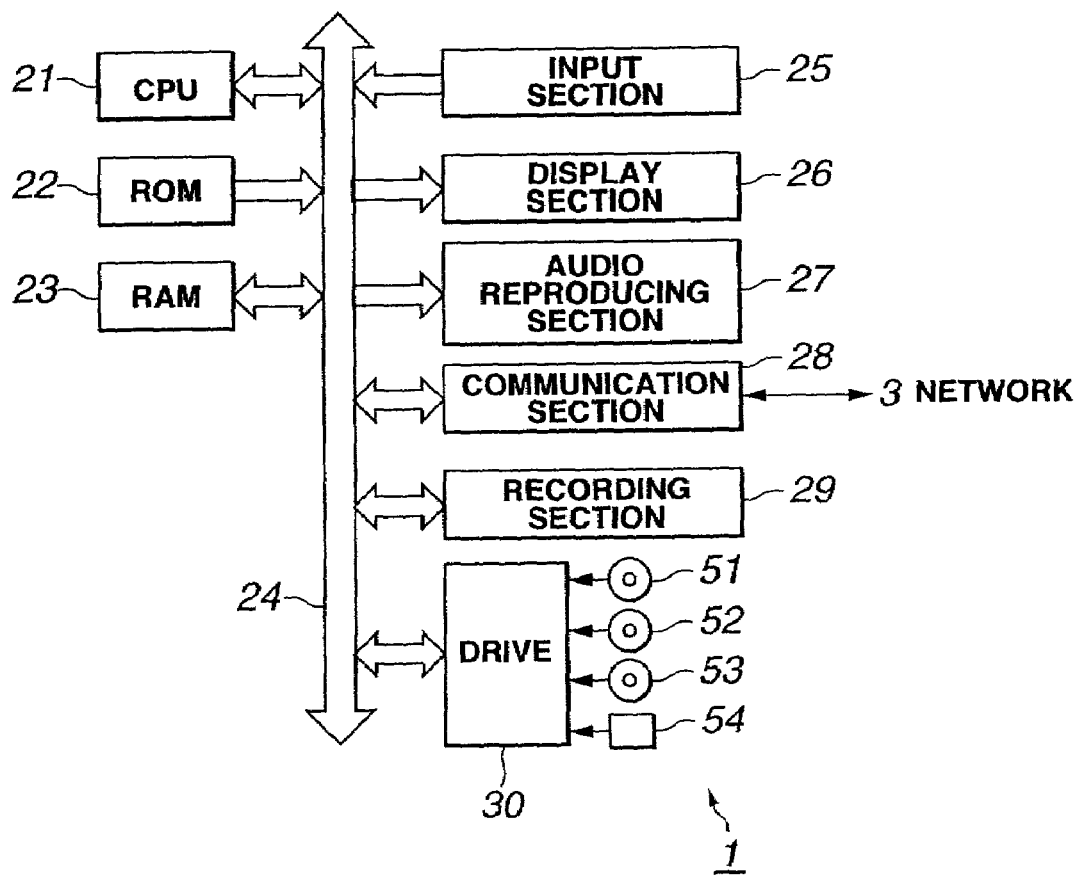
FIG. 2 is a diagram depicting the configuration of a server 201.

FIG. 2 shows an exemplary configuration of the personal computer 1. A CPU (Central Processing Unit) 21 executes various programs stored in a ROM (Read Only Memory) 22 or a RAM (Random Access Memory) 23 to implement various capabilities to be described later with reference to FIG. 3. The ROM 22, constituted by an EEPROM (Electrically Erasable Programmable Read Only Memory) or a flash memory for example, generally stores basically fixed data among the programs and computational parameters to be used by the CPU 21. The RAM 23, constituted by a DRAM (Dynamic RAM) for example, stores programs to be used in the execution by the CPU 21 and parameters which vary from time to time in the execution of these programs.

An input section 25, constituted by a mouse or an input key for example, is operated by the user when inputting various commands into the CPU 21. A display section 26, constituted by a liquid crystal display device for example, displays various information in text or image. An audio reproducing section 27 reproduces the audio data contained in the content supplied from a communication section 28 or the audio data contained in the content recorded in a recording section 29, outputting sound.

The communication section 28 stores the data (for example, a content movement request) supplied from the CPU 21 into predetermined packets via the network 3 and sends the resultant packet to the PDA 2. Also, the communication section 28 outputs the data (a piece of content for example) or a program stored the packets received from the PDA 2 to the CPU 21, the RAM 23, or the recording section 29.

The recording section 29, constituted by a hard disc drive for example, records a particular piece of content along with its additional information, usage conditions, and content key. The recording section 29 supplies the content recorded therein along with its additional information, usage conditions, and content key to the CPU 21 or the RAM 23.

A drive 30 reads the data or programs from a magnetic disc 51, an optical disc 52, a magneto-optical disc 53, or a semiconductor memory 54 and supplies the data or programs to the ROM 22 or the RAM 23 via a bus 24.

The above-mentioned components, the CPU 21 through the drive 30, are interconnected by the bus 24.

The PDA 2 has a configuration similar to that of the personal computer 1 and therefore need not be described.

Figure 3:
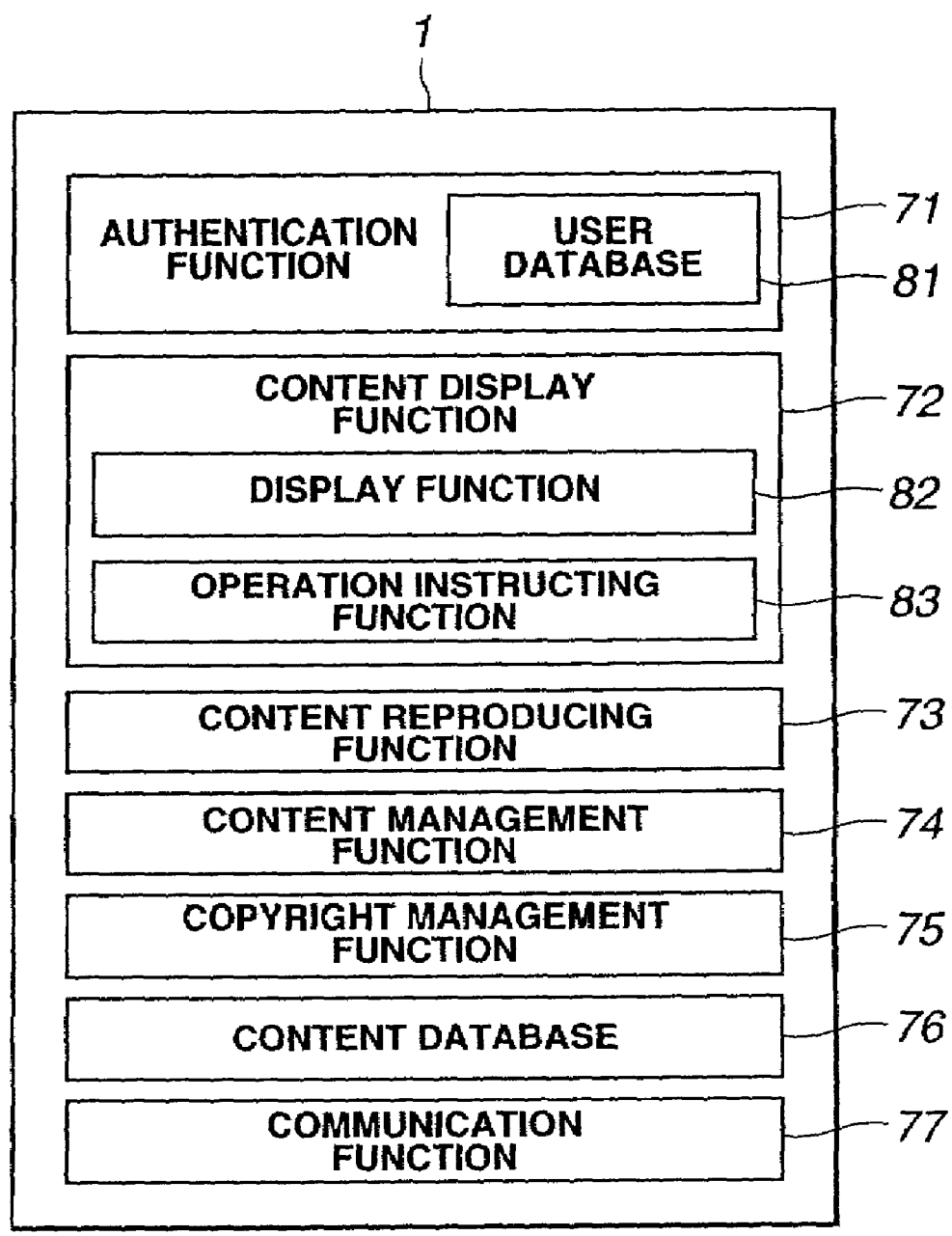
FIG. 3 is a diagram illustrating the function of the server 201.

FIG. 3 describes the capabilities provided by the personal computer 1 to be implemented by the CPU 21 by executing respective programs. The personal computer 1 has an authentication capability 71, a content display capability 72, a content reproduction capability 73, a content management capability 74, a copyright management capability 75, a content database 76, and a communication capability 77.

The authentication capability 71 incorporates a user database 81. The user database 81 records the authentication information of the user (the user ID or password for example for user identification). The authentication capability 71 authenticates the user by use of the data about user operation supplied from the input section 25 and the user authentication information recorded in the user database 81.

The authentication capability 71 stores an authentication key for example necessary for authentication processing and authenticates the PDA 2 via the network 3 by a challenge and response method for example on the basis of the data received by the communication section 28 and the data sent by the communication section 28 under the control of the communication capability 77.

The content display capability 72 has a display capability 82 and an operation instructing capability 83. The display capability 82 displays, in a tree structure for example, the additional information of content for example included in the content information recorded in the content database 76 onto the display section 26. The content information includes device IDs for device identification, content file names (including a so-called path name), content IDs, and content additional information and usage conditions).

Figure 4:
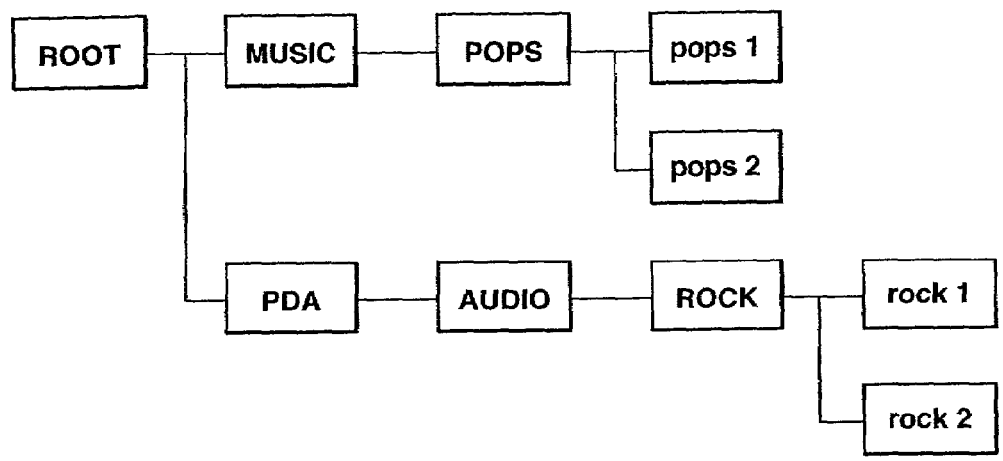
FIG. 4 is diagram showing an image that a display function 252 makes a display section 26 display.

FIG. 4 shows an exemplary screen displayed by the display capability 82 on the display section 26.

In the exemplary screen shown in FIG. 4, the personal computer 1 holds content "pops1" and content "pops2" in directory "\MUSIC \POPS" and the PDA 2 holds content "rock1" and content "rock2" in directory "\AUDIO \ROCK."

When any of the capabilities shown in FIG. 3 operates as a daemon, the display capability 82 does not display content-associated information on the display section 26.

The operation instructing capability 83 instructs the content reproduction capability 73 to reproduce a particular piece of content when the predetermine data associated with a user operation such as a click on the screen is supplied from the input section 25 and causes the display capability 82 to update the display.

When the predetermined data associated with a user operation such as drag and drop are supplied from the input section 25, the operation instructing capability 83 instructs the content management capability 74 to move or copy a particular piece of content and causes the display capability 82 to update the display.

When requested by the user for updating content information, the operation instructing capability 83 instructs the content management capability 74 to update the content information and causes the display capability 82 to update the display.

When requested by the user for ending a currently executed program, the operation instructing capability 83instructs the content management capability 74 to discard the content information associated with the content stored in the PDA 2, thereby ending the program.

On the basis of an instruction given by the operation instructing capability 83, the content reproduction capability 73 decodes the content stored in the content database 76 and reproduces the decoded content. The content reproduction capability 73 causes the copyright management capability 75 to update the usage conditions recorded in the content database 76.

The content management capability 74 writes to the content database 76 the content information about the content stored in the PDA 2 received by the communication section 28 controlled by the communication capability 77.

The content management capability 74 causes the communication section 28 controlled by the communication capability 77 to send the content information about the content stored in the content database 76 to the PDA 2 via the network 3.

When instructed by the operation instructing capability 83 to move or copy a particular piece of content in the content database 76, the content management capability 74 inquires the copyright management capability 75 whether the movement or copy of the content is allowed. If the movement or copy is found allowed on the basis of the usage conditions recorded in the content database 76, the content management capability 74 moves or copies the content to the content database 76. The content management capability 74 instructs the copyright management capability 75 to update the usage conditions on both the source and destination of the moved content.

If the movement or copy is found not allowed by the copyright management capability 75, the content management capability 74 does not move or copy the content.

When instructed by the operation instructing capability 83 to move or copy content from the PDA 2 to the content database 76, the content management capability 74 inquires the copyright management capability 75 whether the movement or copy of the content is allowed or not. If the movement or copy is found allowed, the content management capability 74 causes the communication section 28 under the control of the communication capability 77 to send a content request. The content request to be sent from the communication section 28 to the PDA 2 contains content ID, file name including path name, and movement or copy instruction.

If the movement or copy is found not allowed by the copyright management capability 75, the content management capability 74 does not cause the communication section 28 to send the content request.

The content management capability 74 causes the communication section 28 to receive the content supplied by the PDA 2 and record the received content to the content database 76 and instructs the copyright management capability 75 to update the usage conditions of the received content. At this moment, the content database 76 relates a new content ID to the recorded content.

Receiving from the operation instructing capability 83 an instruction for moving or copying content from the content database 76 to the PDA 2, the content management capability 74 inquires the copyright management capability 75 whether the movement or copy of the content is allowed or not. If the movement or copy is found allowed, the content management capability 74 causes the communication section 28 controlled by the communication capability 77 to send the content along with its content ID, file name of the movement (or copy) destination including path name to the PDA 2.

If the movement or copy is found not allowed by the copyright management capability 75, then the content management capability 74 does not cause the communication section 28 to send the content.

When the communication section 28 has received a content reception acknowledgment from the PDA 2, the content management capability 74 instructs the copyright management capability 75 to update the usage conditions of the transmitted content. For content movement, when the communication section 28 receives a content reception acknowledgment from the PDA 2, the content management capability 74 sets the usage condition so as to prevent the moved content from being used or causes the content database 76 to delete the moved content.

When the communication capability 77 has received from the PDA 2 a content movement or copy request for moving or copying content from the content database 76 to the PDA 2, the content management capability 74 inquires the copyright management capability 75 whether the movement or copy of the content is allowed or not. If the movement or copy is found allowed, then the content management capability 74 causes the communication section 28 controlled by the communication capability 77 to send the content along with its content ID and its file name of movement (or copy) destination including path name to the PDA 2.

If the movement or copy is found not allowed by the copyright management capability 75, then the content management capability 74 does not cause the communication section 28 to send the content.

When the communication section 28 receives a content reception acknowledgement from the PDA 2, the content management capability 74 instructs the copyright management capability 75 to update the usage conditions of the transmitted content. For content movement, when the communication section 28 receives a content reception acknowledgement from the PDA 2, the content management capability 74 sets the usage condition so as to prevent the moved content from being used or causes the content database 76 to delete the moved content.

When the communication capability 77 receives from the PDA 2 the content to be moved or copied to the personal computer 1, the content management capability 74 inquires the copyright management capability 75 whether the movement or copy of the content is allowed or not. If the movement or copy is found allowed, the content management capability 74 causes the content database 76 to record the received content and instructs the copyright management capability 75 to update the usage conditions of the received content. The content database 76 relates a new content ID to the recorded content.

If the movement or copy is found not allowed, then the content management capability 74 discards the received content.

When the personal computer 1 is disconnected from the network 3, the content management capability 74 discards the content information associated with the content recorded in the content database 76 and stored in the PDA 2.

On the basis of the content usage conditions, the copyright management capability 75 enables or disables the reproduction, movement, or copy of the content recorded in the content database 76 and, if the content has been reproduced, moved, or copied, causes the content database 76 to update the usage conditions of the content. On the basis of the content usage conditions, the copyright management capability 75 enables or disables the movement or copy of the content stored in the PDA 2 and, if the content has been moved or copied, causes the content database 76 to update the usage conditions of the content.

The content database 76 records, in a directory structure, the content and its content ID, additional information, usage conditions and content key as one file. When the personal computer 1 is connected to the PDA 2 via the network 3, the content database 76 records the content information associated with the content received from the PDA 2 and recorded in the PDA 2.

FIG. 5 shows one example of the content information recorded in the content database 76. A piece of content of which content ID is "AAA" is recorded on a device (for example, the personal computer 1) of which device ID is "DDD," the name of the content being "111" and its recording date being "YYMMDD." For the piece of content of which content ID is "AAA," its authorized user is "UUU," permitted copy count is 0, permitted movement count is 3, and permitted reproduction count is 10. The piece of content of which content ID is "AAA" is stored in a file of which file name is "audio1" recorded in a directory indicated by path "\ROOT \AUDIO" on the device of which device ID is "DDD."

A piece of content of which content ID is "BBB" is recorded on a device (for example, the PDA 2) of which device ID is "ddd," name of the content being "222" and its recording date being "yymmdd." For the piece of content of which content ID is "BBB," its authorized user is "uuu," permitted copy count is 0, permitted movement count is 3, and permitted reproduction count is 10. The piece of content of which content ID is "BBB" is stored in a file of which file name is audio2 recorded in a directory indicated by path \ROOT \AUDIO on the device of which device ID is "ddd."

The communication capability 77 controls the communication section 28 to cause the same to receive content or content information from the PDA 2 via the network 3 and send content or content information to the PDA 2.

It should be noted that the capabilities of the PDA 2 are generally the same as those of the personal computer 1 and therefore need not be described.

The following describes the processing to be executed by the content display system associated with the present invention. In what follows, the processing in which the personal computer 1 displays content will be described.

The processing of displaying content by the personal computer 1 will be described with reference to the flowchart shown in FIG. 6. In step S11, the personal computer 1 executes an initialization process. The details of this process will be described later with reference to the flowchart shown in FIG. 7.

In step S12, the operation instructing capability 83 of the content display capability 72 determines on the basis of a signal supplied from the input section 25 whether the reproduction of content has been requested or not. If the reproduction is found requested, then the process goes to step S13, in which the operation instructing capability 83 causes the content reproduction capability 73 to decode the encrypted content by the content key and execute a process for reproducing the decoded content. When the reproduction process is completed, the process returns to step S12 to repeat the decision process. The details of the reproduction process will be described later with reference to the flowchart shown in FIG. 8.

If, in step S12, the reproduction is found not requested, then the procedure goes to step S14, in which the operation instructing capability 83 of the content display capability 72 determines on the basis of a signal supplied from the input section 25 corresponding to a drag and drop operation for example or the data supplied from the communication capability 77 (for example, corresponding to a content movement request by the PDA 2) whether a content movement request has been made. If a content movement request is found, then the procedure goes to step S15, in which the content management capability 74 executes a content movement process. When the content movement process is completed, the procedure returns to step S12 to repeat the decision process. The details of the movement process will be described later with reference to the flowcharts shown in FIGS. 9 and 10.

If, in step S14, no content movement request is found, then the procedure goes to step S16, in which the operation instructing capability 83 of the content display capability 72 determines on the basis of a signal supplied from the input section 25 or the data supplied from the communication capability 77 whether a content information update request has been made or not. If a content information update request is found, then the procedure goes to step S17, in which the content management capability 74 executes a content information update process. When the content information update process is completed, the procedure returns to step S12 to repeat the decision process. The details of the content information update process will be described later with reference to the flowchart shown in FIG. 11.

If, in step S16, no content information update request is found, then the process goes to step S18, in which the operation instructing capability 83 of the content display capability 72 determines on the basis of a signal supplied from the input section 25 whether the display processing is to be ended or not. If the display processing is not to be ended, the process returns to step S12 to repeat the decision process.

If, in step S18, the display processing is to be ended, then the process goes to step S19, in which the operation instructing capability 83 causes the content management capability 74 to execute the end processing, upon which the display processing comes to an end. The details of the end processing will be described later with reference to the flowchart shown in FIG. 12.

As described, the personal computer 1 displays the content information corresponding to the content stored in the personal computer 1 itself and the content stored in the PDA 2. At the same time, the personal computer 1 can move or copy the content stored in itself or the content stored in the PDA 2.

The content display processing by the PDA 2 is generally the same as that by the personal computer 1 and therefore need not be described.

Figure 6:
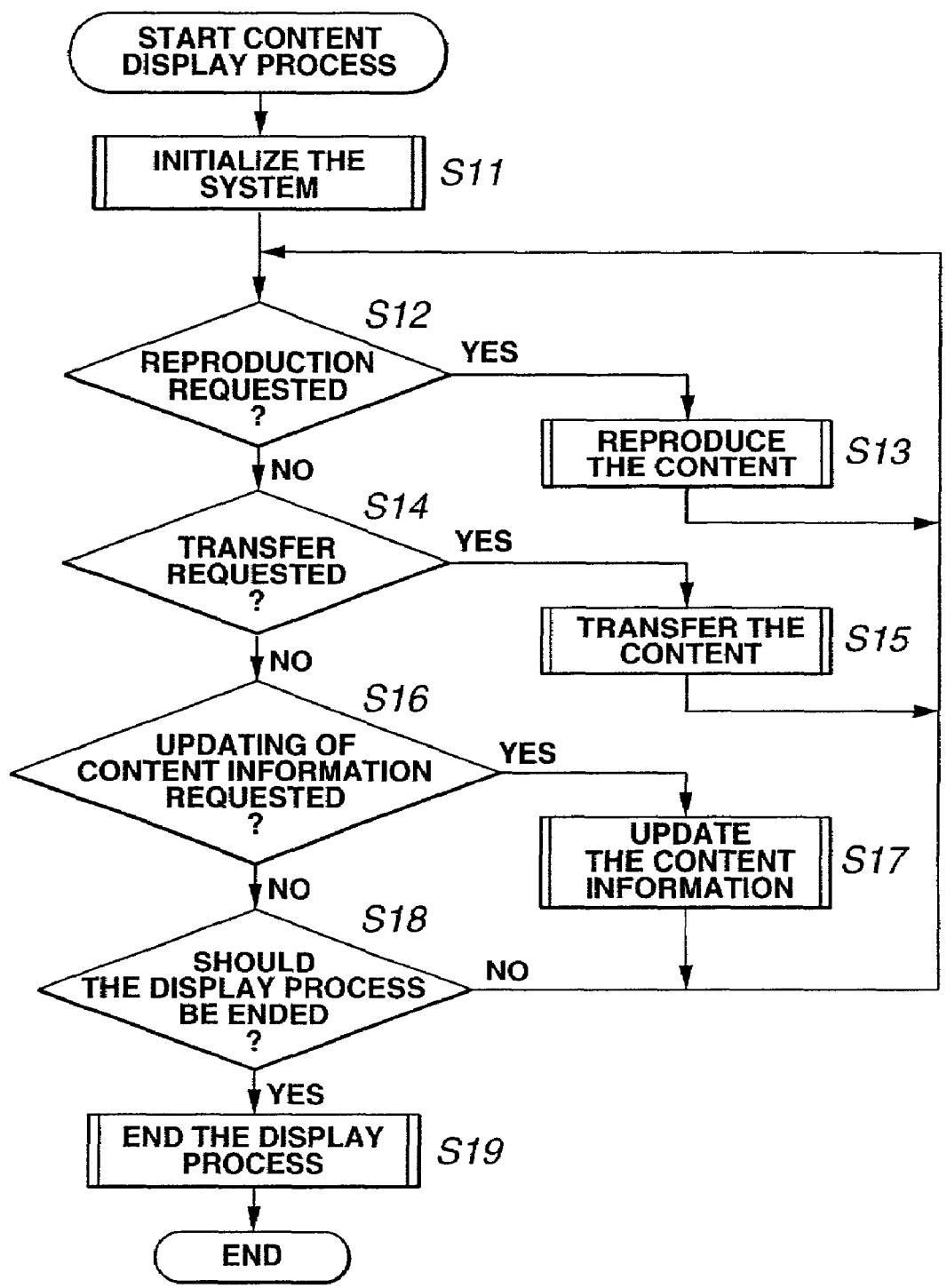
FIG. 6 is a flowchart explaining how the content is displayed.
Figure 7:
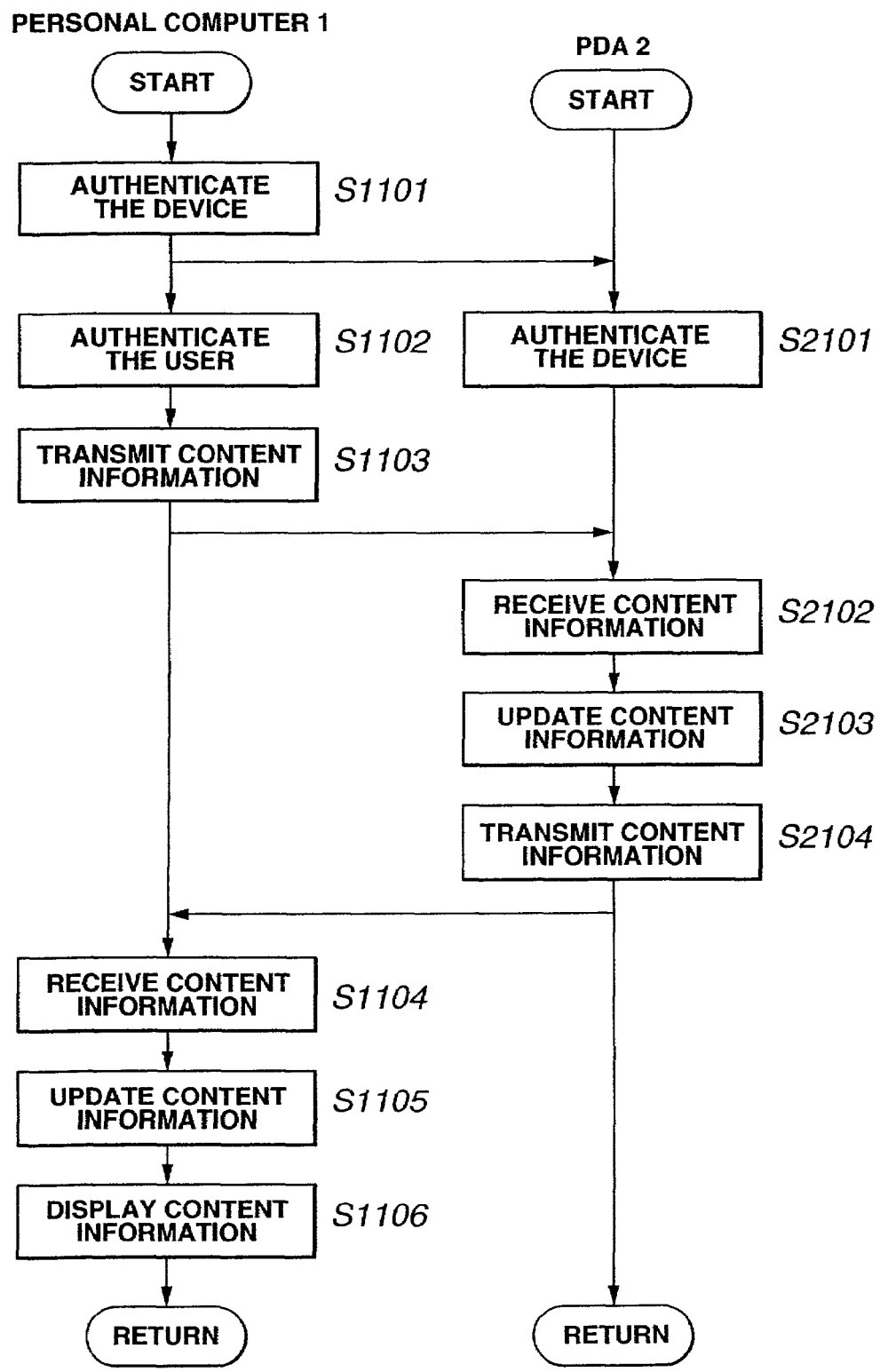
FIG. 7 is a flowchart explaining an initialization process.

The following describes the details of the initialization processing of step S11 shown in FIG. 6 with reference to the flowchart shown in FIG. 7. In step S1101, the authentication capability 71 executes a process of authenticating the PDA 2 by use of a challenge and response method for example. If, in step S1101, the PDA 2 is found not compliant, the processing comes to an end without updating the content information.

In step S2101, the PDA 2 executes a process of authenticating the personal computer 1. If, in step S2101, the personal computer is found not compliant, then the processing comes to an end without updating the content information.

If, in step S1101, the PDA 2 is found compliant, authenticating the PDA 2, and if, in step S2101, the personal computer 1 is found compliant, authenticating the personal computer 1, then the procedure goes to step S1102, in which the authentication capability 71 authenticates the user on the basis of the data supplied from the input section 25 or the user authentication information recorded in the user database 81. If, in step S1102, the user is found not authorized, then the processing comes to an end without updating the content information.

If, in step S1102, the user is found authorized, authenticating the user, then the procedure goes to step S1103, in which the content management capability 74 reads the content information associated with the content recorded by itself from the content database 76 and causes the communication capability 77 to send the retrieved content to the PDA 2 via the network 3.

In step S2102, the PDA 2 receives the content information sent by the personal computer 1. In step S2103, a content management capability, not shown, of the PDA 2 updates the stored content information on the basis of the received content information. Namely, the PDA 2 adds the content information associated with the content stored in the personal computer 1 to the content information recorded in the PDA2.

In step S2104, the content management capability of the PDA 2 sends the content information associated with the content stored in itself to the personal computer 1 via the network 3.

In step S1104, the communication capability 77 receives the content information sent from the PDA 2. In step S1105, the content management capability 74 causes the content database 76 to update the content information. Namely, the content database 76 records the content information received in step S1104 and associated with the content stored in the PDA 2.

In step S1106, the display capability 82 displays on the display section 26 the content information associated with the content stored in the personal computer 1 and the content information associated with the content stored in the PDA 2, upon which the processing comes to an end.

Thus, after the cross-authentication process, the personal computer 1 and the PDA 2 exchange the content information to update it. The personal computer 1 can display on the display section 26 the content information associated with the content stored in itself and the content information associated with the content stored in the PDA 2.

Figure 8:
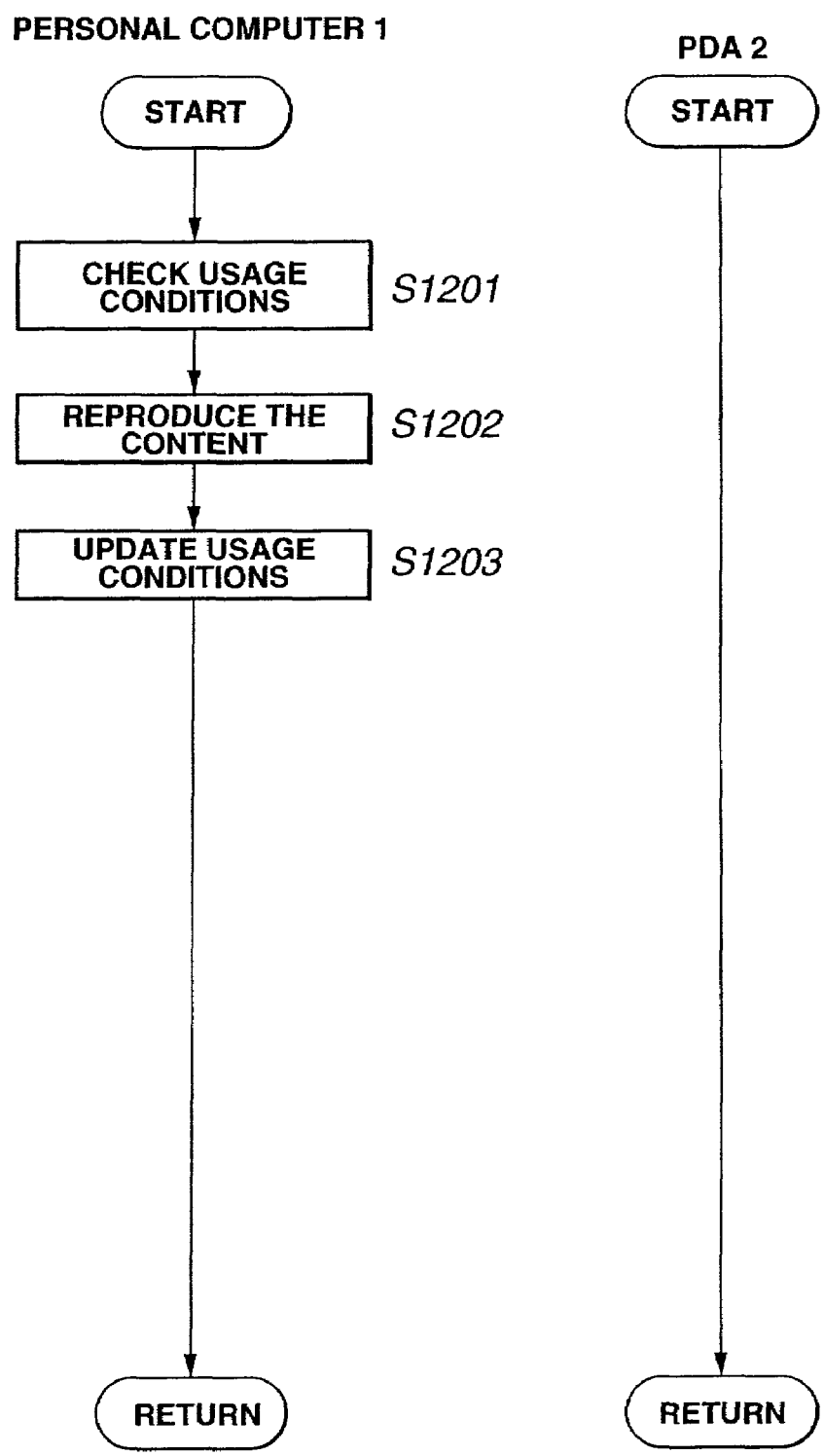
FIG. 8 is a flowchart explaining how the content is reproduced.

The following describes the details of the reproduction processing of step S13 shown in FIG. 6 with reference to the flowchart of FIG. 8. In step S1201, the copyright management capability 75 checks the usage conditions of the content recorded in the content database 76 and requested for reproduction. If the usage conditions do not allow reproduction, the processing comes to an end without reproducing the content.

If the usage conditions allow reproduction, the procedure goes to step S1202, in which the content reproduction capability 73 decrypts the encrypted content with the content key to reproduce the decrypted content. In step S1203, the copyright management capability 75 updates the usage conditions of the reproduced content (for example, decrementing the reproduction count by 1) to end the processing.

Thus, the personal computer 1 reproduces content when its reproduction is allowed on the basis of its usage conditions.

Figure 9:
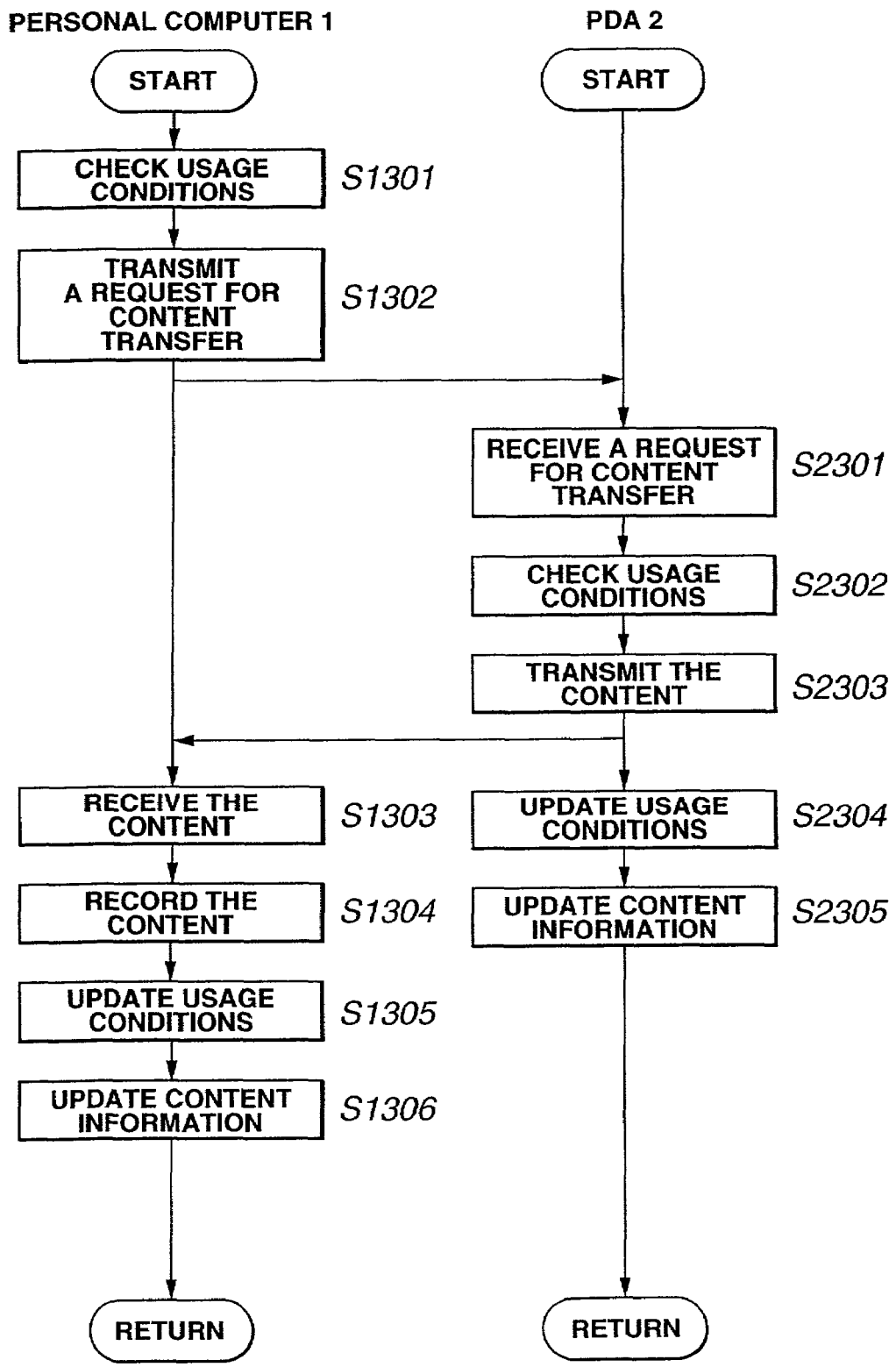
FIG. 9 is a flowchart describing the process of moving the content.

The following describes the details of moving content from the PDA 2 to the personal computer 1 described in step S15 of FIG. 6, with reference to the flowchart shown in FIG. 9. In step S1301, the copyright management capability 75 checks the usage conditions for the content requested for movement stored in the content database 76. The usage conditions for the content stored in the PDA 2 are recorded in the content database 76 by the initialization process.

If the usage conditions of the content requested for movement do not allow movement, then the processing comes to an end without moving the content.

If the usage conditions of the content requested for movement permit movement, then the procedure goes to step S1302, in which the content management capability 74 causes the communication capability 77 to send a content movement request to the PDA 2 via the network 3.

In step S2301, the PDA 2 receives the content movement request. In step S2302, a copyright management capability, not shown, of the PDA 2 checks the usage conditions (stored in the PDA 2) of the content requested for movement. If the usage conditions of the content requested for movement permit movement, then the processing comes to an end without moving the content.

If the usage conditions of the content requested for movement permit movement, then the procedure goes to step S2303, in which the PDA 2 sends the content requested for movement to the personal computer 1 via the network 3.

In step S1303, the communication capability 77 of the personal computer 1 causes the communication section 28 to receive the content. In step S1304, the content management capability 74 causes the content database 76 to record the received content. In step S1305, the copyright management capability 75 causes the content database 76 to update the usage conditions of the recorded content. In step S1306, the content management capability 74 causes the content database 76 to update the content information about the recorded content.

In step S2304, the content management capability of the PDA 2 updates the usage conditions of the transmitted content. In step S2305, the content management capability of the PDA 2 updates the content information about the transmitted content, upon which the processing comes to an end.

Thus, in response to a request by the personal computer 1 on the basis of the usage conditions, the PDA 2 can move the content recorded in it to the personal computer 1.

Figure 10:
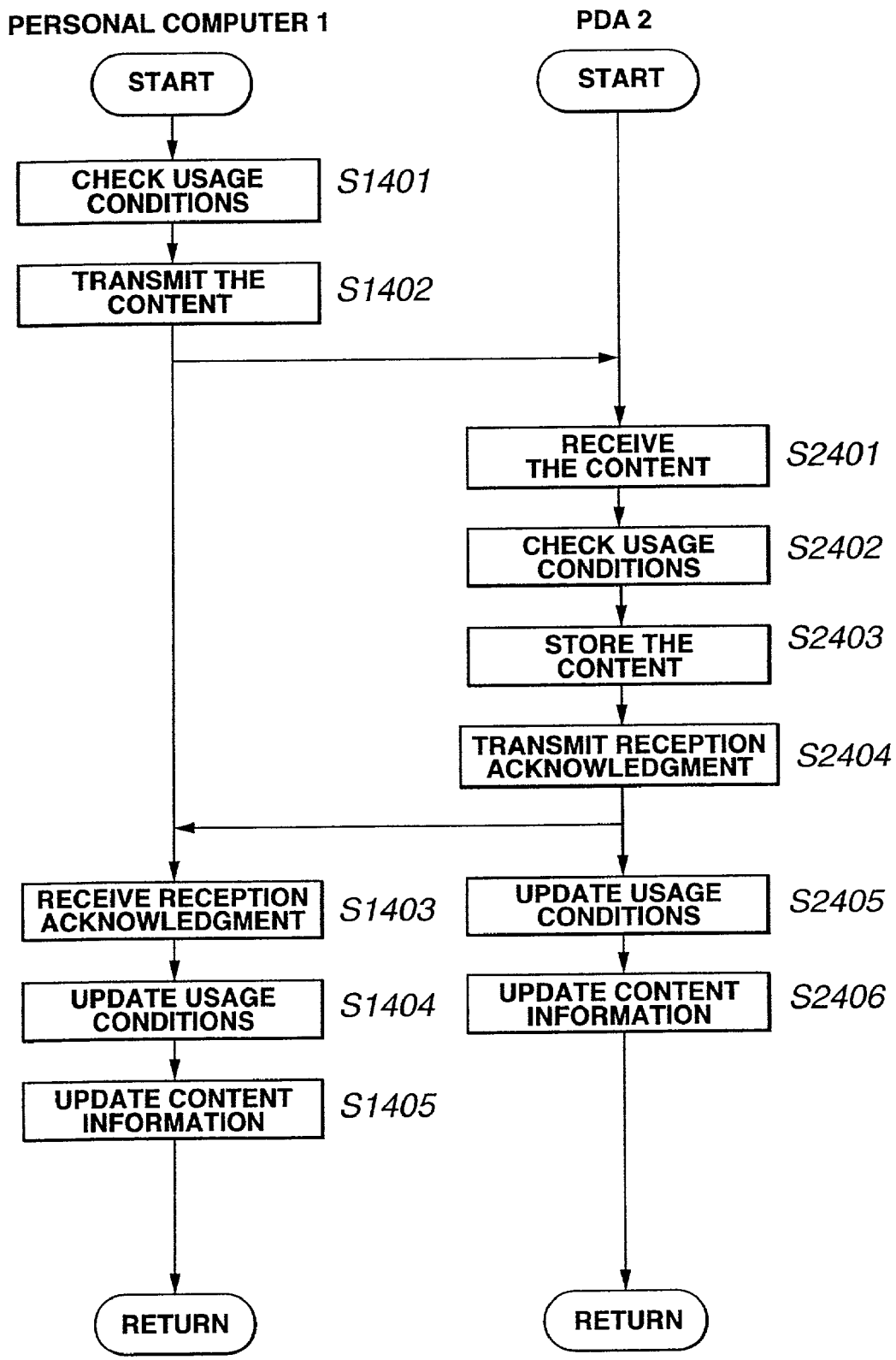
FIG. 10 is a flowchart explaining the process of moving the content.

The following describes the details of moving content from the personal computer 1 to the PDA 2 described in step S15 of FIG. 6, with reference to the flowchart of FIG. 10. In step S1401, the copyright management capability 75 checks the usage conditions of the content requested for movement stored in the content database 76. If the usage conditions do not permit movement, then the processing comes to an end without moving the content.

If the usage conditions of the content requested for movement permit movement, then the procedure goes to step S1402, in which the content management capability 74 causes the communication capability 77 to send the content to the PDA 2 via the network 3.

In step S2401, the PDA 2 receives the content. In step S2402, the copyright management capability of the PDA 2 checks the usage conditions of the content requested for movement. If the usage condition do not permit movement, then the processing comes to an end by discarding the received content.

If the usage conditions permit movement, then the procedure goes to step S2403, in which the content database, not shown, of the PDA 2 stores the received content. In step S2404, the content management capability of the PDA 2 sends a content reception acknowledgement to the personal computer 1 via the network 3.

In step S1403, the communication capability 77 of the personal computer 1 causes the communication section 28 to receive the content reception acknowledgement. In step S1404, the copyright management capability 75 causes the content database 76 to update the usage conditions of the transmitted content. In step S1405, the content management capability 74 causes the content database 76 to update the content information about the transmitted content.

In step S2405, the content management capability of the PDA 2 updates the usage conditions of the stored content. In step S2406, the content management capability of the PDA 2 updates the content information about the stored content, upon which the processing comes to an end.

Thus, on the basis of the usage conditions, the personal computer 1 can move the recorded content to the PDA 2.

It should be noted that content copy processing is executed in generally the same manner as content movement processing and therefore need not be described.

Figure 11:
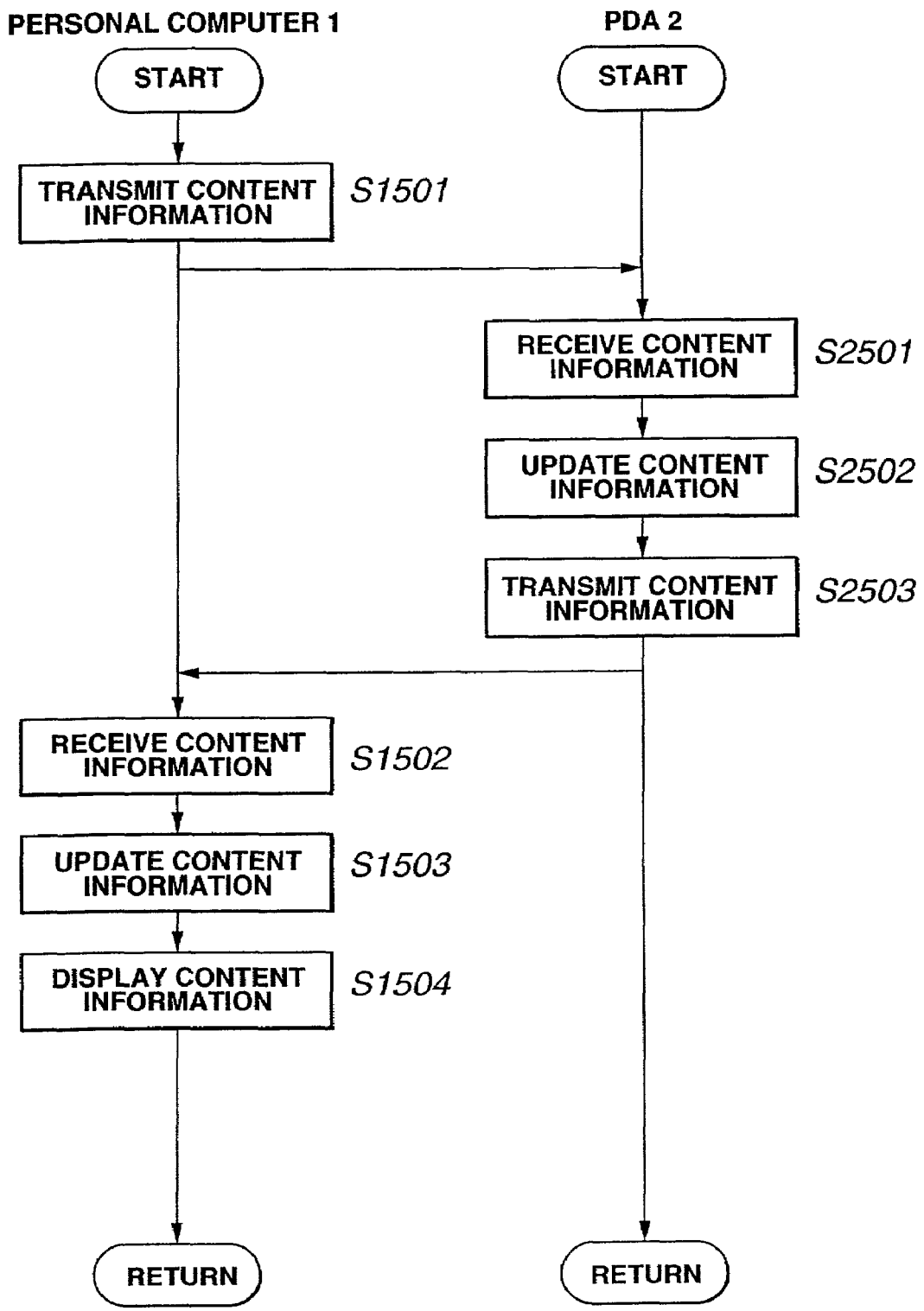
FIG. 11 is a flowchart describing a process of updating the content data.

The following describes the details of content information update processing described in step S17 of FIG. 6, with reference to the flowchart of FIG. 11. In step S1501, the content management capability 74 reads the content information associated with the content recorded in itself from the content database 76 and causes the communication capability 77 to send the retrieved content to the PDA 2 via the network 3.

In step S2501, the PDA 2 receives the content information transmitted by the personal computer 1. In step S2502, the PDA 2 updates the recorded content information on the basis of the content information associated with the content recorded in the personal computer 1. In step S2503, the PDA 2 sends the content information associated with the content stored in itself to the personal computer 1 via the network 3.

In step S1502, the communication capability 77 receives the content information sent from the PDA 2. In step S1503, the content management capability 74 causes the content database 76 to update the content information on the basis of the content information received in step S1502. In step S1504, the display capability 82 causes the display section 26 to display the updated content information, upon which the processing comes to an end.

Thus, on the basis of the content information received from the PDA 2, the personal computer 1 updates the content information recorded in the content database 76. The PDA 2 updates the content information on the basis of the content information received from the personal computer 1.

Figure 12:
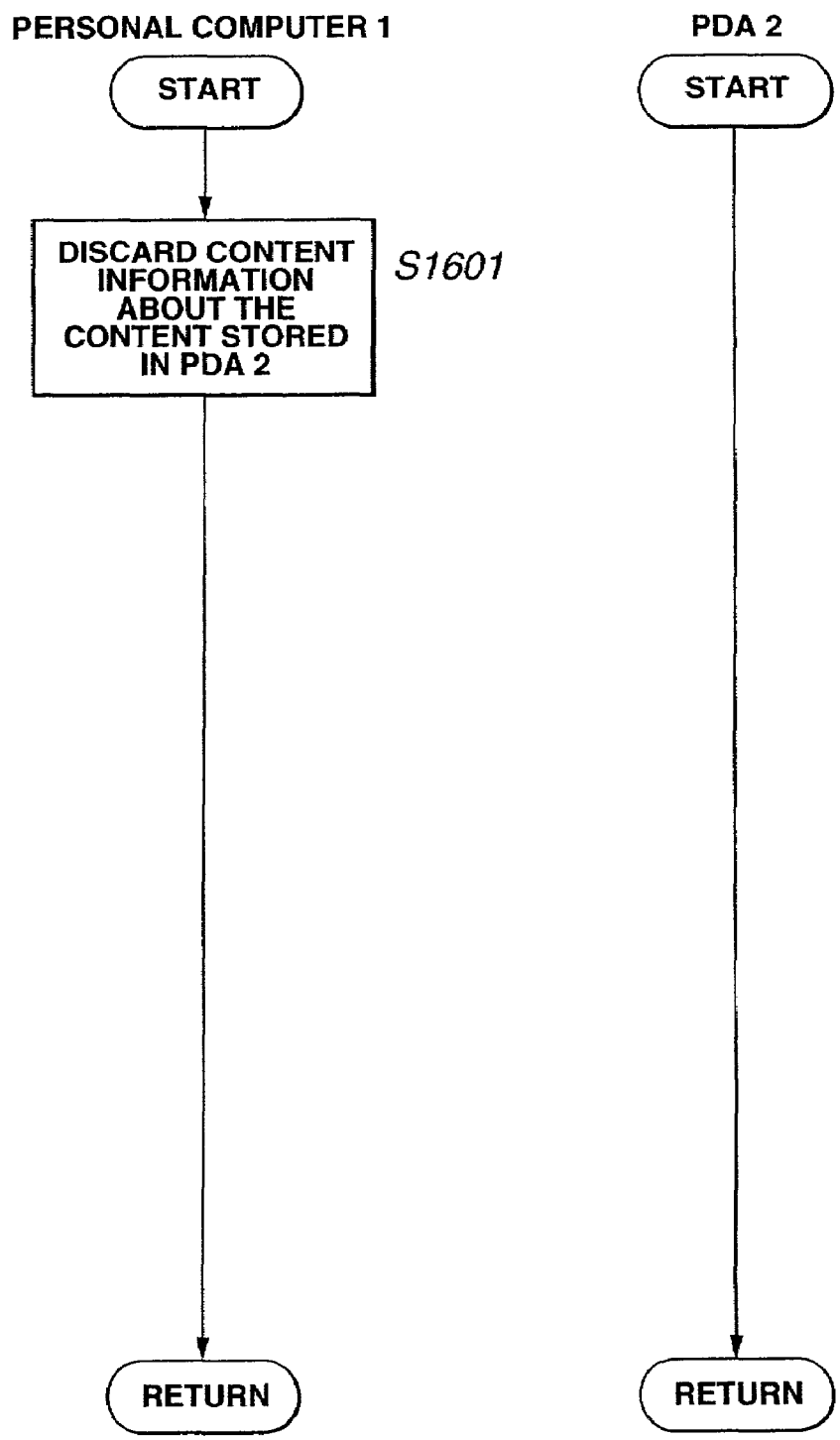
FIG. 12 is a flowchart describing how to terminate the process.

The following describes the details of the end processing described in step S19 of FIG. 6, with reference to the flowchart of FIG. 12. In step S1601, the content management capability 74 causes the content database 76 to discard the content information associated with the content in the PDA 2 (the content information with the device ID corresponding to the PDA 2), upon which the processing comes to an end.

Thus, when ending the content display processing, the personal computer 1 discards the content information associated with the content stored in the PDA 2. Therefore, the personal computer 1 displays on the display section 26 only the content information associated with the content stored in the devices connected to the personal computer 1.

The following describes another embodiment of the content display system associated with the present invention.

Figure 13:
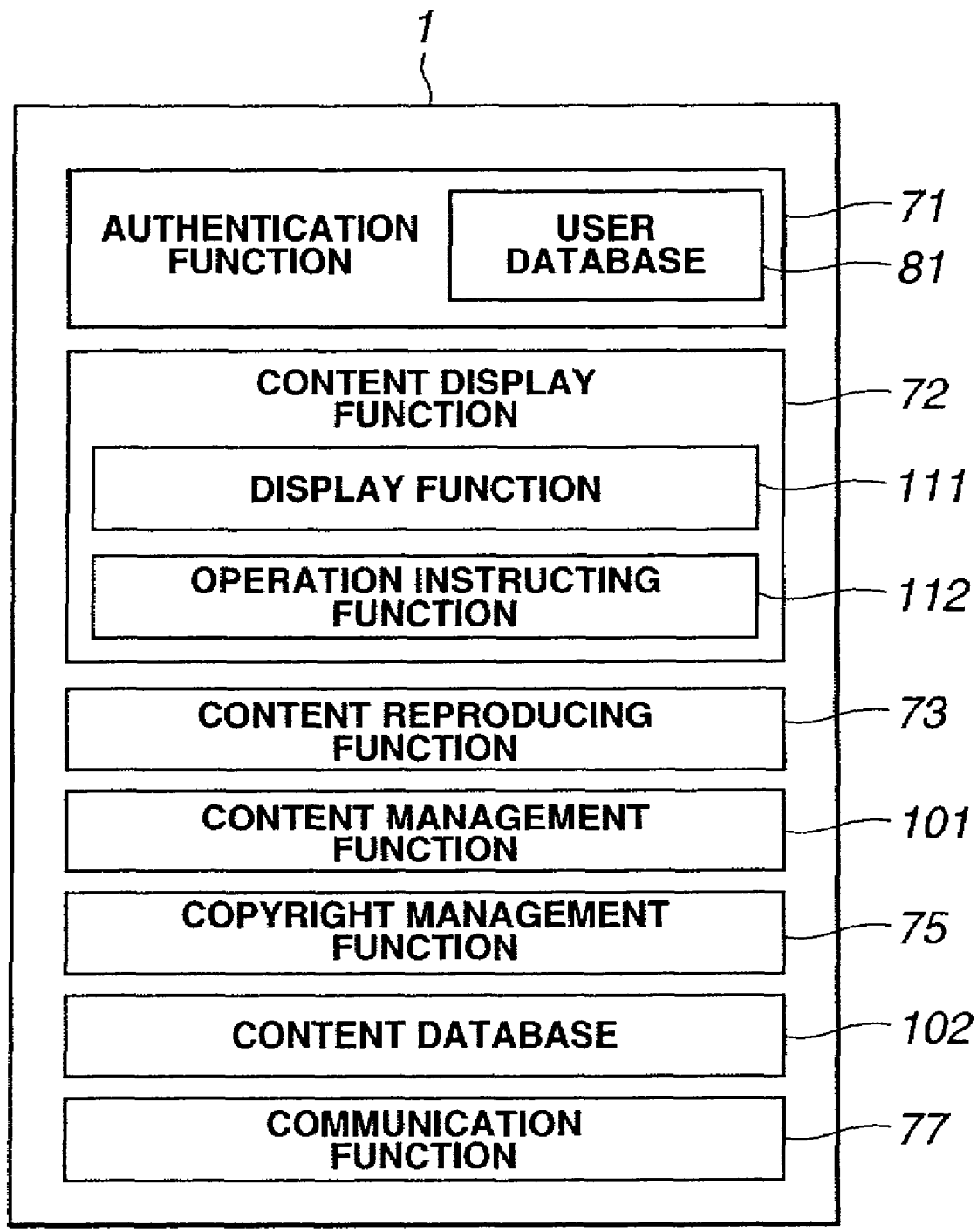
FIG. 13 is a diagram illustrating a server 201 according to another embodiment.

FIG. 13 shows other capabilities of the personal computer 1 to be realized by the program execution by the CPU 21. With reference to FIG. 13, components similar to those described with reference to FIG. 3 are denoted by the same reference numerals and need not be described.

A content display capability 72 has a display capability 111 and a operation instructing capability 112. The display capability 111 displays in a tree structure the information about the content recorded in a content database 102 onto a display section 26.

On the basis of a connection status flag recorded in the content database 102, the display section 111 displays the content information in different colors or shapes depending on whether the device storing the content indicated by the content information is connected or not.

Figure 14:
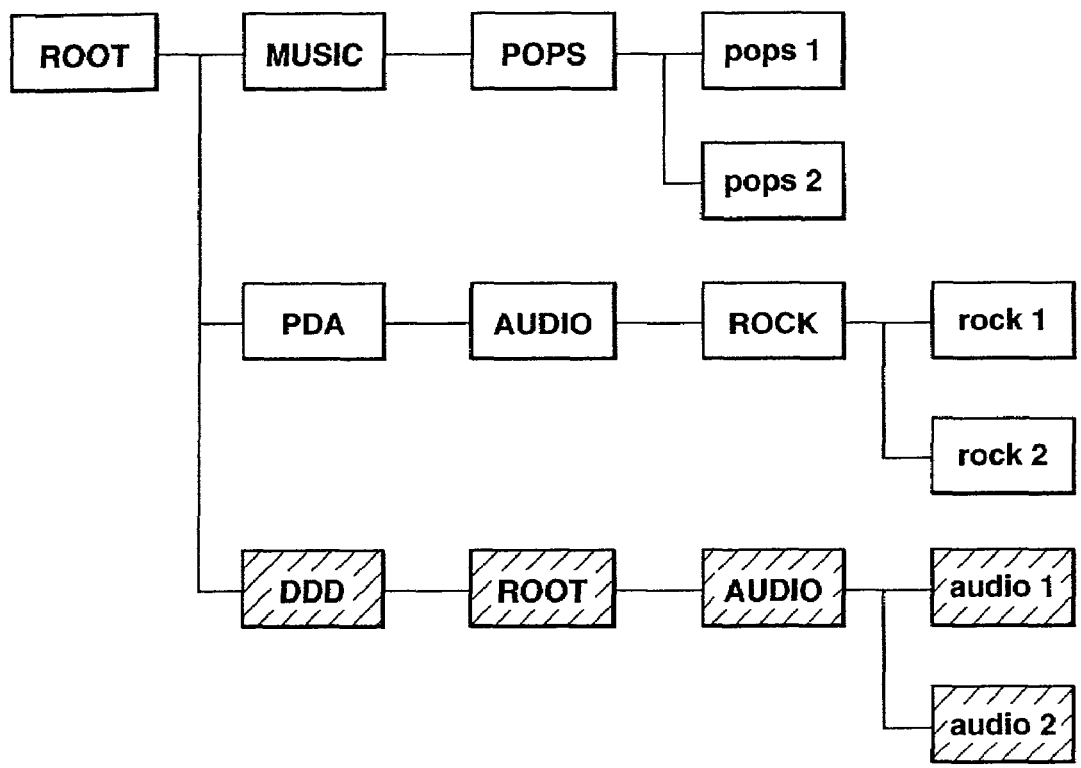
FIG. 14 is diagram showing an image that a display function 111 makes the display section 26 display.

FIG. 14 shows an exemplary screen which is displayed by the display capability 111 onto the display section 26.

The display example shown in FIG. 14 indicates that the personal computer 1 is holding content "pops1" and content "pops2" in directory "\MUSIC \POPS" and the PDA 2 connected to the personal computer 1 is holding content "rock1" and "rock2" in directory "\AUDIO \ROCK." The display example shown in FIG. 14 indicates that a device DDD (for example, a portable personal computer not shown) not connected to the personal computer 1 is holding content "audio1" and content "audio2" in directory "\ROOT \AUDIO."

As shown in FIG. 14, the display capability 111 displays in blue the content information about the content stored in a device connected to the personal computer 1 and in red the content information about the content stored in a device not connected to the personal computer 1.

Consequently, the user of the personal computer 1 can instantly know whether the device storing a desired piece of content is connected to the personal computer 1.

It should be noted that the display capability 111 may display, in a different manner, the background shapes of the content information about the content stored in a device connected to the personal computer 1 and of the content information about the content stored in a device not connected to the personal computer 1. For example, the display capability 111 displays, in a square, the background of the content information about the content stored in a device connected to the personal computer 1 and, in a circle, the background of the content information about the content stored in a device not connected to the personal computer 1.

If the capabilities shown in FIG. 13 operate as a daemon, the display capability 111 does not display the information about content onto the display section 26.

When predetermined data have been supplied from the input section 25 as a result of an operation made by the user such as clicking on the screen, the operation instructing capability 112 instructs a content reproduction capability 73 to reproduce the content and causes the display capability 111 to update the display. When predetermined data have been supplied from the input section 25 as a result of an operation made by the user such as a drag and drop, the operation instructing capability 112 instructs a content management capability 101 to move or copy the content and causes the display capability 111 to update the display.

When requested by the user for updating content information, the operation instructing capability 112 instructs the content management capability 101 to update the content information and causes the display capability 111 to update the display.

When the PDA 2 is connected to the personal computer 1, the operation instructing capability 112 causes the content management capability 101 to update the connection status flag corresponding to the content information of content stored in the PDA 2. When the PDA 2 is disconnected from the personal computer 1, the operation instructing capability 112 causes the content management capability 101 to update the connection status flag corresponding to the content information of content stored in the PDA 2.

When requested by the user for ending the content display processing, the operation instructing capability 112 causes the content management capability 101 to update the connection status flag corresponding to the content information about content stored in the PDA 2, thereby ending the program.

When a communication section 28 controlled by a communication capability 77 has received, from the PDA 2, the content information about the content stored in the PDA 2, the content management capability 101 causes the content database 102 to discard the content information about the content stored in the PDA 2 and write the received content information.

The content management capability 101 causes the communication section 28 controlled by the communication capability 77 to send the content information about the content stored in the content database 102 to the PDA 2.

When the personal computer 1 is connected to the PDA 2 via the network 3, the content management capability 101 rewrites to "true" a connection status flag included in the content information about the content recorded in the content database 102 and stored in the PDA 2, "true" being indicative of that the personal computer 1 is connected to the PDA 2.

When the personal computer 1 is disconnected from the PDA 2 via the network 3, the content management capability 101 rewrites to "false" the connection status flag included in the content information about the content recorded in the content database 102 and stored in the PDA 2, "false" being indicative of that the personal computer 1 is disconnected from the PDA 2.

When instructed by the operation instructing capability 112 to move or copy content inside the content database 102, the content management capability 101 inquires the copyright management capability 75 whether the content movement or copy is permitted or not. If the content movement is found permitted, the content management capability 101 causes the content database 102 to move or copy content and instructs the copyright management capability 75 to update the usage conditions of both the source and the destination.

If the content movement or copy is found not permitted, the content management capability 101 does not execute the content movement or copy processing.

When instructed by the operation instructing capability 112 to move or copy content from PDA 2 to the content database 102, the content management capability 101 inquires the copyright management capability 75 whether content movement or copy is permitted or not. If the content movement or copy is found permitted, the content management capability 101 causes the communication section 28 controlled by the communication capability 77 to send a content request. The content request to be sent from the communication section 28 to the PDA 2 includes content ID, file name including path name, and movement or copy operation instruction.

If the content movement or copy is found not permitted by the copyright management capability 75, the content management capability 101 sends no content request.

The content management capability 101 causes the communication section 28 to receive the content sent by the PDA 2 and causes the content database 102 to record the received content and instructs the copyright management capability 75 to update the usage conditions of the received content. The content database 102 relates a new content ID to the recorded content.

Instructed by the operation instructing capability 102 to move or copy content from the content database 102 to the PDA 2, the content management capability 101 inquires the copyright management capability 75 whether content movement or copy is permitted or not. If the content movement or copy is found permitted, the content management capability 101 causes the communication section 28 controlled by the communication capability 77 to send the content along with its content ID and the movement (or copy) destination file name including path name to the PDA 2.

If the content movement or copy is found not permitted, then the content management capability 101 sends no content.

When, after the content has been sent, the communication section 28 receives a content reception acknowledgement from the PDA 2, the content management capability 101 instructs the copyright management capability 75 to update the usage conditions of the transmitted content.

For content movement processing, the content management capability 101 causes the content database 102 to delete the transmitted content.

Requested by the PDA 2 for moving or copying content from the content database 102 to the PDA 2, the content management capability 101 inquires the copyright management capability 75 whether content movement or copy is permitted or not. If the content movement or copy is found permitted, the content management capability 101 causes the communication section 28 controlled by the communication capability 77 to send the content along with its content ID and the movement (or copy) destination file name including path name to the PDA 2.

If the content movement or copy is found not permitted, the content management capability 101 does not send the content.

When, after the content has been sent, the communication section 28 receives a content reception acknowledgement from the PDA 2, the content management capability 101 instructs the copyright management capability 75 to update the usage conditions of the transmitted content. When a content movement request has been made, the content management capability 101 causes the content database 102 to delete the moved content.

Receiving the content to be moved or copied from the PDA 2 to the personal computer 1, the content management capability 101 inquires the copyright management capability 75 whether content movement or copy is permitted or not. If the content movement or copy is found permitted, the content management capability 101 causes the content database 102 to record the received content and instructs the copyright management capability 75 to update the usage conditions of the received content. The content database 102 relates a new content ID to the recorded content.

If the content movement or copy is found not permitted, the content management capability 101 discards the received content.

The content database 102 records, in a directory structure, the content, its content ID, device ID, connection status flag, additional information, usage conditions, and content key as one file.

The connection status flag indicates whether a device identified by the corresponding device ID is connected to the personal computer 1 or not. The "true" connection status flag indicates that a device identified by the corresponding device ID is connected to the personal computer 1. The "false" connection status flag indicates that a device identified by the corresponding device ID is not connected to the personal computer 1.

When the personal computer 1 is connected to the PDA 2 via the network 3 and when the content information about the content stored in the PDA 2 is received, the content database 102 discards the content information for the PDA 2 stored so far and records the received content.

FIG. 15 shows one example of the content information stored in the content database 102. A piece of content of which content ID is "AAA" is recorded on a device of which device ID is "DDD," the name of the content being "111" and its recording date being "YYMMDD." Because the connection status flag corresponding to the device of which device ID is "DDD" is "false," the device of which device ID is "DDD" is not connected to the personal computer 1.

For the piece of content of which content ID is "AAA," its authorized user is "UUU," permitted copy count is 0, permitted movement count is 3, and permitted reproduction count is 10. The piece of content of which content ID is "AAA" is stored in a file of which file name is audio1 recorded in a directory indicated by path \ROOT \AUDIO \ on the device of which device ID is "DDD."

A piece of content of which content ID is "BBB" is recorded on a device of which device ID is "DDD," name of the content being "222" and its recording date being "yymmdd." For the piece of content of which content ID is "BBB," its authorized user is "uuu," permitted copy count is 0, permitted movement count is 3, and permitted reproduction count is 10. The piece of content of which content ID is "BBB" is stored in a file of which file name is audio2 recorded in a directory indicated by path \ROOT \AUDIO \ on the device of which device ID is "DDD."

The following describes the processing to be executed by the content display system having the other capabilities shown in FIG. 13.

The content display processing is generally the same as that described with reference to FIG. 6 and therefore need not be described.

Figure 16:
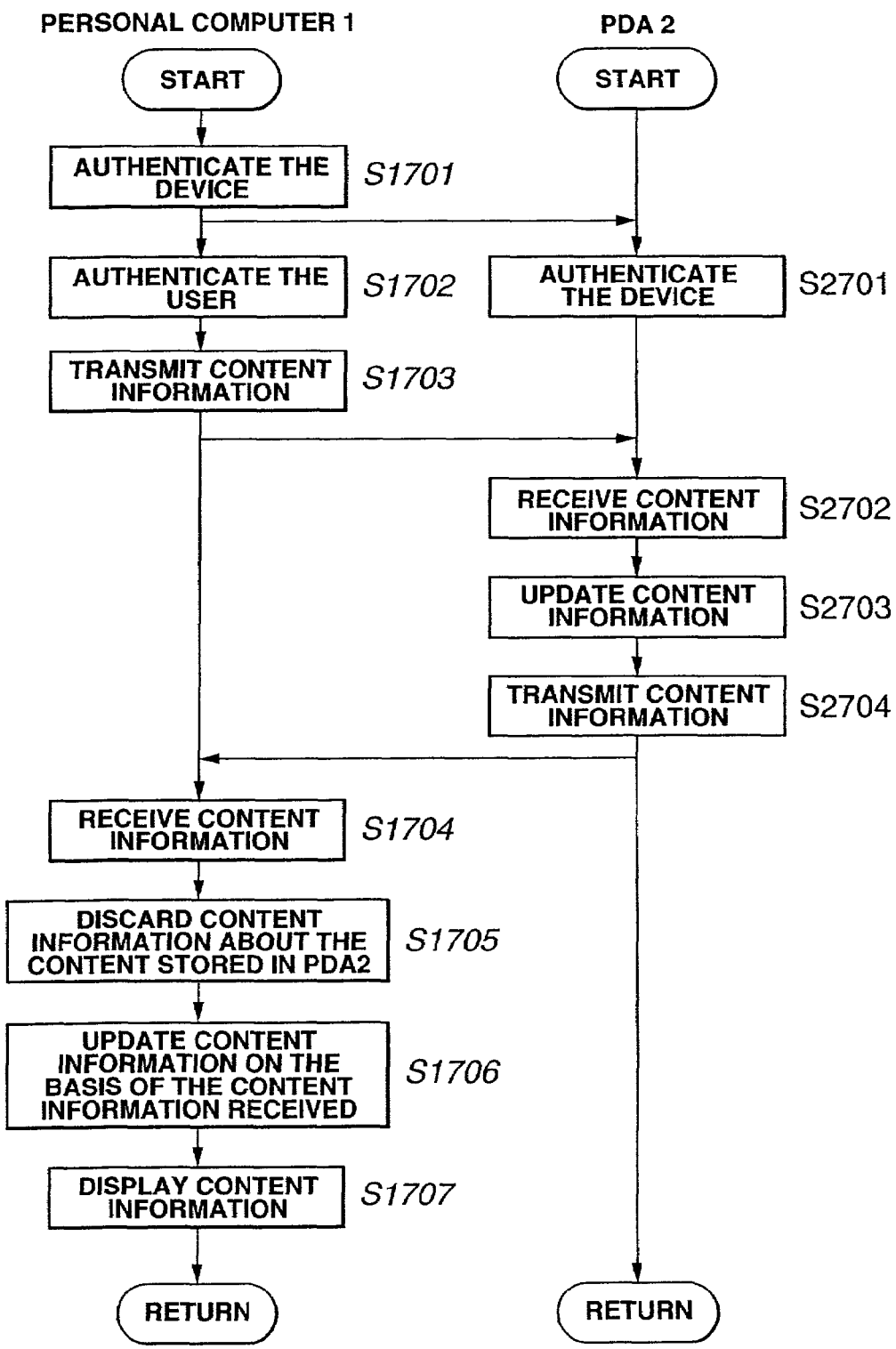
FIG. 16 is a flowchart explaining an initialization process.

The following describes the details of the initialization processing with reference to the flowchart shown in FIG. 16. The processes of steps S1701 through S1704 are generally the same as those of steps S1101 through S1104 and therefore need not be described.

In step S1705, the content management capability 101 causes the content database 102 to discard the content information about content stored in the PDA 2. In step S1706, the content management capability 101 causes the content database 102 to update the content information on the basis of the content information received in step S1704. Namely, the content database 102 records the received content information about the content stored in the PDA 2 and sets the connection status flag corresponding to the device ID of the PDA 2 to "true."

In step S1707, the display capability 82 displays the updated content information onto the display section 26, upon which the content display processing comes to an end. The display capability 82 displays, in different images, the content information for which connection status flag is "true" and the content information for which connection status flag is "false"; for example, the content information in blue for which connection status is "true" and the content information in red for which connection status is "false."

Thus, the personal computer 1 can update the content information about the content stored in the PDA 2 and, at the same time, update the connection status flag. The personal computer 1 displays the content information in a color or a shape depending on the setting of the connection status flag.

The content reproduction processing is generally the same as that described with reference to FIG. 8 and therefore need not be described.

The content movement processing is generally the same as that described with reference to FIG. 9 or 10 and therefore need not be described.

Figure 17:
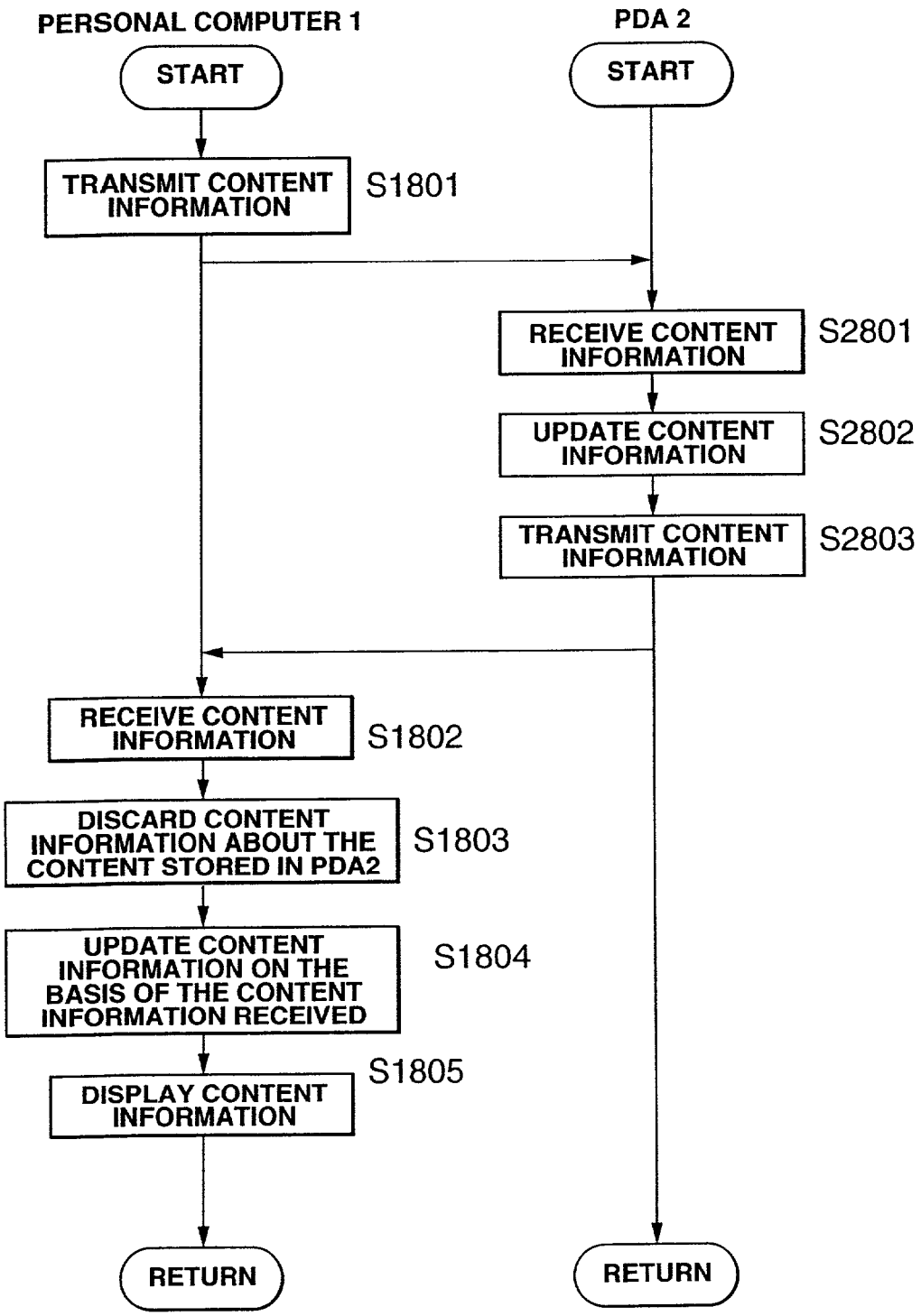
FIG. 17 is a flowchart describing a process of updating the content data.

The following describes content information update processing with reference to the flowchart shown in FIG. 17. The processes of steps S1801 through S1802 are generally the same as those of steps S1501 through S1502 of FIG. 11 and therefore need not be described.

In step S1803, the content management capability 101 causes the content database 102 to discard the content information about the content stored in the PDA 2. In step S1804, the content management capability 101 causes the content database 102 to update the content information on the basis of the content information received in step S1802.

In step S1805, the display capability 82 causes the display section 26 to display the updated content information, upon which the content information update processing comes to an end.

Thus, the personal computer 1 updates the content information and displays the updated content information.

Figure 18:
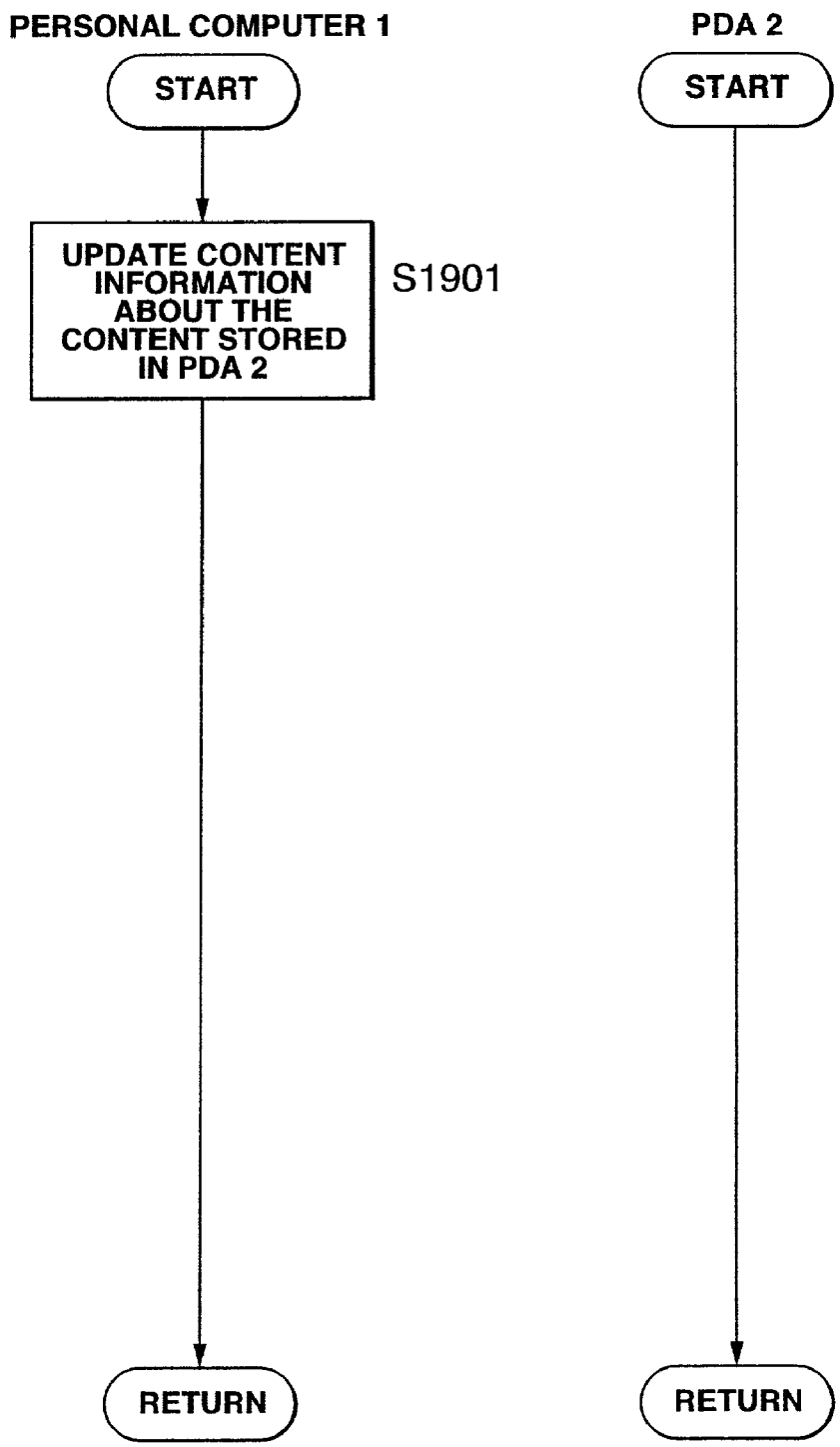
FIG. 18 is a flowchart describing how to terminate the process.

The following describes end processing with reference to the flowchart shown in FIG. 18. In step S1901, the content management capability 74 causes the content database 76 to set to "false" the connection status flag for the content information associated with the content stored in the PDA 2, upon which the content display processing comes to an end.

Thus, when ending the content display processing, the personal computer 1 updates the connection status flag contained in the content information about the content stored in the PDA 2.

In the above description, the personal computer 1 is connected to the PDA 2 via the network 3. It will be apparent to those skilled in the art that the personal computer 1 may also be connected to a mobile telephone, a PHS (Personal Handyphone System) terminal, a digital still camera, a digital video camera, a vehicle navigation device, a television receiver, a radio receiver, or a portable device for example to execute the above-mentioned various processing operations.

In the above description, the personal computer 1 is connected to the PDA 2 via the network 3. It will be apparent to those skilled in the art that the personal computer 1 may also be connected to the PDA 2 via public switched phone line, mobile telephone communication line, PHS, the Internet, Bluetooth communication, digital satellite broadcasting, or other wired or wireless communication media.

The content to be recorded or stored in the personal computer 1 or the PDA 2 is not restricted to music and image; the content may also be audio data, text data, programs, or data for executing programs.

In addition to DES, the above-mentioned content may be encrypted by another block encryption of common key encryption, stream encryption, or public key encryption.

Figure 19:
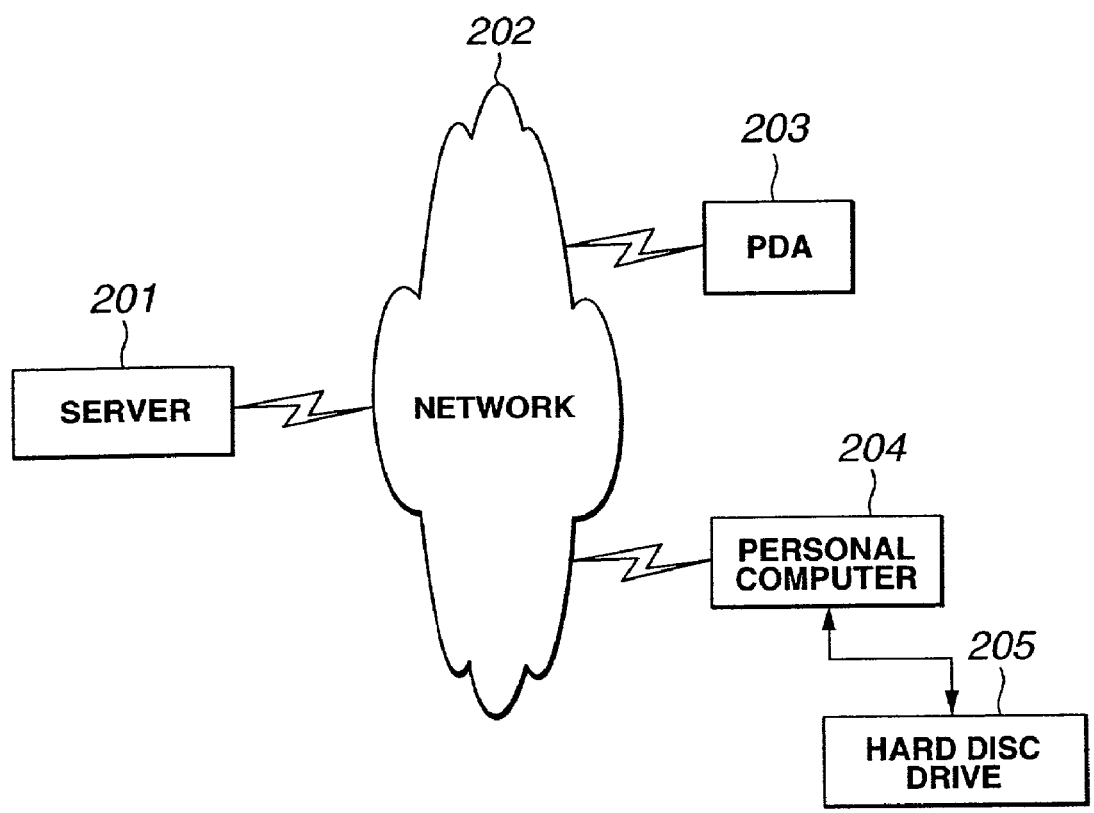
FIG. 19 is a diagram showing a content display system according to another embodiment of the present invention.

FIG. 19 is a diagram that shows a content display system according to another embodiment of the present invention.

A server 201 is connected by a network 202 to a PDA 203 and a personal computer 204.

The network 202 is either a local area network or the Internet. The local area network may be a network defined by IEEE 1394 or a network defined by IEEE 802.3.

The server 201 records content and the content information and content key, both corresponding to content. The content is music and images such as moving pictures or still pictures. The content has been encrypted by a specific system such as DES.

The server 201 records the content information about the content that is stored in the PDA 203, the personal computer 204 or a hard disc drive 205.

The server 201 authenticates its user in accordance with the user ID or password it has already stored. Using the authentication key stored in it, the server 201 authenticates the PDA 203 or the personal computer 204 via the network 202.

The server 201 uses the password stored in it, thus authenticating the user of the PDA 203 or personal computer 204 through the network 202.

The server 201 receives the content information about the content stored in the PDA 203, from the PDA 203 through the network 202. In accordance with the content information it has received, the server 201 updates the content information it has recorded.

The server 201 receives the content information recorded in the personal computer 204, from the personal computer 204 through the network 202. In accordance with the content information it has received, the server 201 updates the content information it has recorded.

The server 201 receives the content information about the content that is recorded in the hard disc drive 205, from the personal computer 204 through the network 202. In accordance with the content information it has received, the server 201 updates the content information it has recorded.

After updating the content information about the content stored in the PDA 203, the personal computer 204 or the hard disc drive 205, the server 201 transmits the content information updated, to the PDA 203 and the personal computer 204 through the network 202.

In response to a request made by the PDA 203 or the personal computer 204, the server 201 transfers or copies the content it records, to the PDA 203, the personal computer 204 or the hard disc drive 205, in accordance with the content usage conditions it records.

In response to a request made by the PDA 203, the server 201 transfers or copies the content recorded in the personal computer 204 or the hard disc drive 205, to the PDA 203, in accordance with the content usage conditions recorded in the personal computer 204 or the hard disc drive 205.

In response to a request made by the personal computer 204, the server 201 transfers or copies the content recorded in the PDA 203 to the personal computer 204 or the hard disc drive 205, in accordance with the content usage conditions recorded in the PDA 203.

In response to a request made by the PDA 203, the server 201 transfers or copies the content stored in the personal computer 204, to the hard disc drive 205, in accordance with the content usage conditions recorded in the personal computer 204.

In response to a request made by the PDA 203, the server 201 transfers or copies the content stored in the hard disc drive 205, to the personal computer 204, in accordance with the content usage conditions recorded in the hard disc drive 205.

The PDA 203 stores the content, the content information and the content key.

The PAD 203 authenticates the user of the PDA 203. The PDA 203 authenticates the server 201 through the network 202.

The PDA 203 receives the content information about the content recorded in the PDA 203, personal computer 204 or hard disc drive 205, from the server 201 through the network 202. Based on the content information thus received, the PDA 203 updates the content information it stores. The PDA 203 displays the content information about the content that is recorded in the PDA 203, personal computer 204 or hard disc drive 205.

The PDA 203 transmits the content information about the content it records, to the server 201 through the network 202.

When operated by the user, the PDA 203 requests that the server 201 should transfer or copy the content recorded in the server 201, personal computer 204 or hard disc drive 205.

When operated by the user, the PDA 203 reproduces the content it records, in accordance with the content usage conditions it stores.

The personal computer 204 stores content, along with the content information about the content and a content key.

The personal computer 204 authenticates its user. It authenticates the server 201, too, through the network 202.

The personal computer 204 receives the content information about the content recorded in the PDA 203, personal computer 204 or hard disc drive, from the server 201 through the network 202. Based on the content information it has received, the personal computer 204 updates the content information it records.

The personal computer 204 displays the content information about the content recorded in the PDA 203, personal computer 204 or hard disc drive 205.

The personal computer 204 transmits the content information about the content recorded in the personal computer 204 or the hard disc drive 205, to the sever 201 through the network 202.

When operated by the user, the personal computer 204 requests that the server 201 transfer and copy the content recorded in the server 201 or the PDA 203.

When operated by the user, the personal computer 204 reproduces the content recorded in it or the hard disc drive 205 in accordance with the usage conditions of the content that are recorded in the personal computer 204 or the hard disc drive 205.

The hard disc drive 205 records the content, together with the content information and the content key, under the control of the personal computer 204.

Under the control of the personal computer 204, too, the hard disc drive 205 supplies the content, content information and content key, all recorded in it, to the personal computer 204.

The server 201 has the same structure as the personal computer 1 shown in FIG. 2. Therefore, its structure is not described herein.

The PDA 203 has the same structure as the personal computer 1 shown in FIG. 2. Therefore, the structure of the PDA 203 is not described herein.

The personal computer 204 has the same structure as the personal computer 1 shown in FIG. 1. Therefore, the structure of the personal computer 204 is not described herein.

Figure 20:
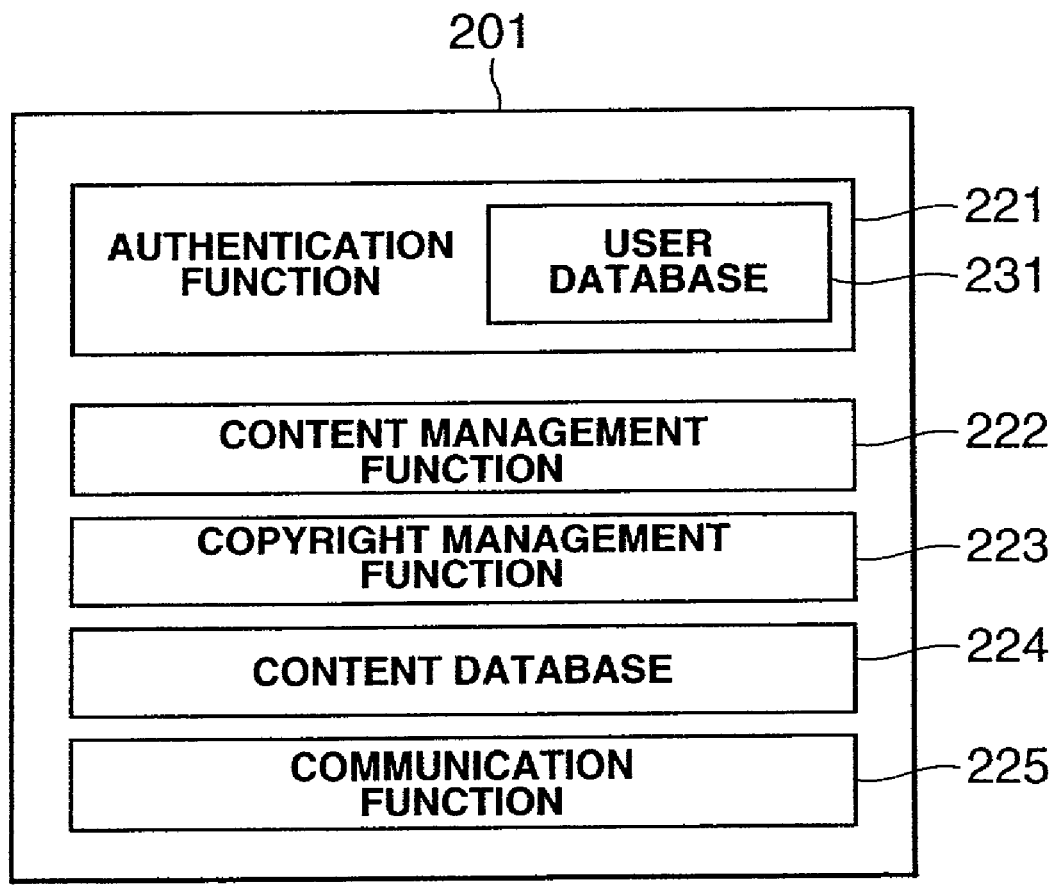
FIG. 20 is a diagram for explaining the function of a server 201.

FIG. 20 is a diagram explaining the function of a server 201. The server 201 has an authentication function 221, a content management function 222, a copyright management function 223, a content database 224, and a communication function 225.

The authentication function 221 incorporates a user database 231. The user database 231 records the authentication data (i.e., user ID or password, for example) of the user of the server 201, PDA 203 or personal computer 204. The authentication function 221 authenticates the user of the server 201, PDA 203 or personal computer 204, based on the data about the user operation and the user authentication data. The user authentication data is recorded in the user database 231.

The authentication function 221 stores the authentication key and the like, which are necessary for the authentication process. It authenticates the PDA 203 or the personal computer 204 via the network 202, by the challenge-and-response method, on the basis of, for example, the data received or transmitted under the control of the communication function 225.

The content management function 222 updates the content information recorded in the content database 224, on the basis of the content information transmitted from the PDA 203 or the personal computer 204 and received by the communication function 225.

The content management function 222 causes the communication function 225 to transmit the content information recorded in the content database 224, to the PDA 203 or the personal computer 204 through the network 202.

The content management function 222 may receive a request for transfer of the content recorded in the server 201, from the PDA 203 or the personal computer 204.

When the content management function 222 receives this request, it asks the copyright management function 223 if the transfer or copying of the content has been permitted. From the usage conditions recorded in the content database 224 the copyright management function 223 determines whether the transfer or copying of the content has been permitted.

If the function 223 determines that the transfer or copying of the content has been permitted, the content management function 222 causes the content database 224 to transfer or copy the content. The content management function 222 instructs the copyright management function 223 to update the usage conditions of both the data source and data destination.

Assume that it is requested that the content be transferred from the server 201 to the PDA 203 or the personal computer 204. If the function 223 determines that the transfer or copying of the content has been permitted, the content management function 222 reads the content from the content database 224 and causes the communication function 225 to transmit the content to either the PDA 203 or the personal computer 204.

The function 223 may not determine that the transfer or copying of the content has been permitted. In this case, the content management function 222 will not serve to transfer or copy the content.

The communication function 225 may receive from the PDA 203 a request for the transfer or copying of the content that are recorded in the personal computer 204 or the hard disc drive 205. When the function 225 receives this request, the content management function 222 causes the communication function 225 to transmit the request to the personal computer 204 via the network 202.

When the communication function 225 receives from the personal computer 204 a request for the transfer or copying of the content stored in the PAD 203, the content management function 222 causes the communication function 225 to transmit the request to the PDA 203 through the network 202.

The request for the transfer or copying of the content, which the communication function 225 transmits to the PDA 203 or the personal computer 204 contains a content ID, a file name including a path and an operation instruction (such as the transfer or the copying).

When the communication function 225 receives the content from the PDA 203 or the personal computer 204, the content management function 222 causes the function 225 to record the content into the content database 224.

When the content are transferred or copied to the PDA 203 or personal computer 204, the content management function 222 instructs the content database 224 to update the content transferred or copied to the PDA 203 or personal computer 204. When the content are transferred or copied from the PDA 203 or personal computer 204, the communication function 222 instructs the content database 224 to update the content transferred or copied from the PDA 203 or personal computer 204.

When the PDA 203 is disconnected from the network 202, the content management function 222 causes the content database 224 to update the content information that corresponds to the content stored in the PDA 203.

When the personal computer 204 is disconnected from the network 202, the content management function 222 causes the content database 224 to update the content information that corresponds to the content stored in the personal computer 204.

The copyright management function 223 permits or inhibits the transfer or copying of the content stored in the content database 224, in accordance with the usage conditions. When the content are transferred or copied, the copyright management function 223 causes the content database 224 to update the usage conditions of the content.

The content database 224 records the content, content ID, content information and content key, in the form of a single file of directory structure.

The communication function 225 receives the content or the content information that has been transmitted from the PDA 203 or the personal computer 204 through the network 202. The communication function 225 transmits the content or the content information to the PDA 203 or the personal computer 204 through the network 202.

Figure 21:
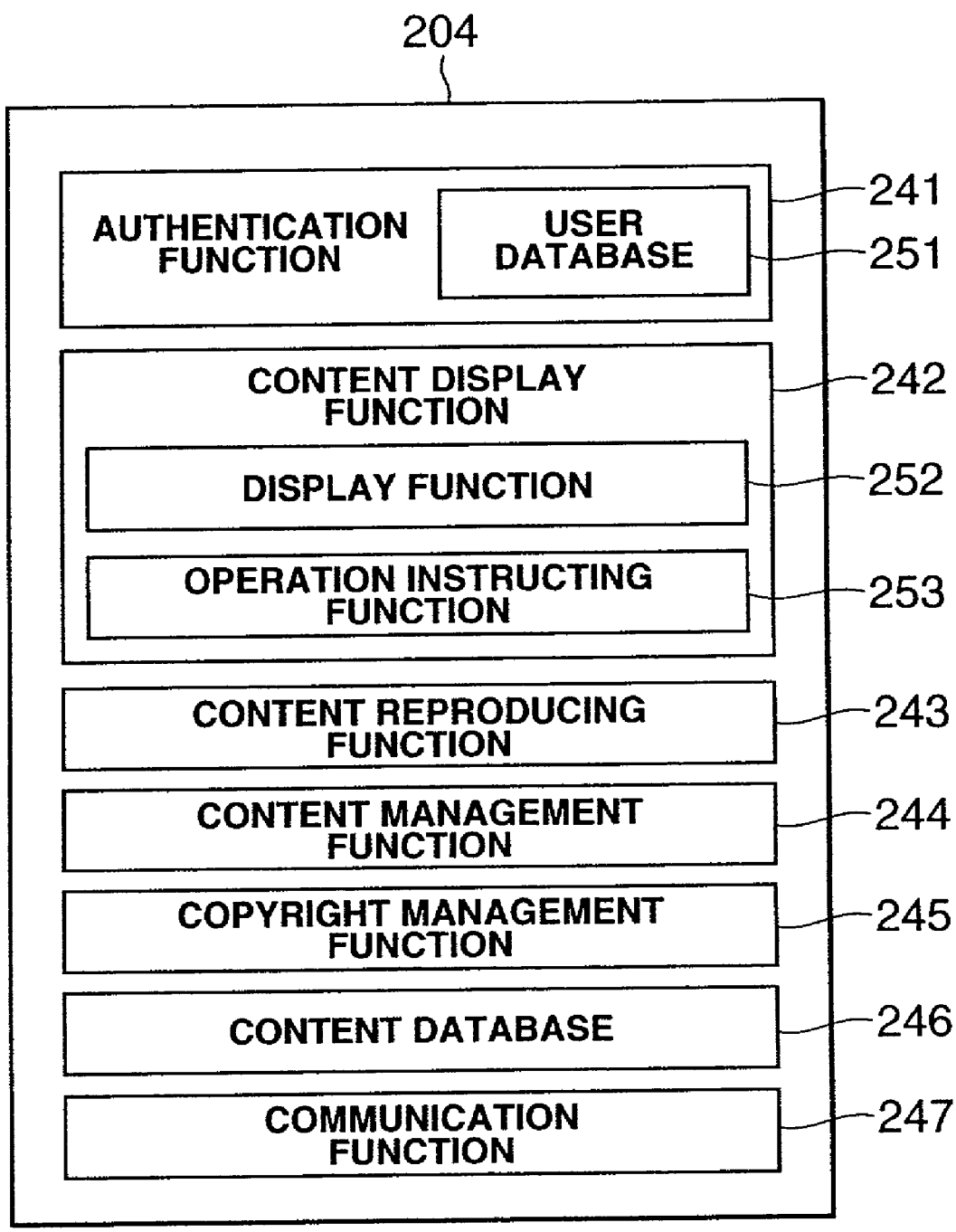
FIG. 21 is a diagram describing the function of a personal computer 204.

FIG. 21 is a diagram describing the function of the personal computer 204. The personal computer 204 has an authentication function 241, a content display function 242, a content reproduction function 243, a content management function 244, a copyright management function 245, a content database 246, and a communication function 247.

The authentication function 241 incorporates a user database 251. The user database 251 records the authentication data (i.e., user ID or password, for example) of the user of the personal computer 204. The authentication function 241 authenticates the user of the personal computer 204, based on the data about the user operation and the user authentication data. The user authentication data is recorded in the user database 251.

The authentication function 241 stores the authentication key and the like, which are necessary for the authentication process. It authenticates the server 201 via the network 202, by the challenge-and-response method, on the basis of the data the communication function 247 has received and transmitted.

The content display function 242 has a display function 252 and an operation instructing function 253. The display function 252 displays the additional data associated with the content and contained in the content information that is recorded in the content database 246.

When the operation instructing function 253 receives the data representing a user's operation, such as clicking on the screen, it instructs the content reproduction function 243 to reproduce the content and the display function 252 to update the display.

When the operation instructing function 253 receives the data representing a user's operation, such as drag and drop, it instructs the content management function 224 to transfer or copy the content, or to transmits a request for the transfer or copying of the content to the communication function 247.

The content reproduction function 243 decodes the content recorded in the content database 246 in accordance with the instruction supplied from the operation instructing function 247, thus reproducing the content. When the content reproduction function 243 reproduces the content, it causes the copyright management function 245 to update the usage conditions that are recorded in the content database 246.

The communication function 247 may receive the content information from the server 201. In accordance with the content information the function 247 has received, the content management function 244 causes the content database 246 to update the content data.

When the content are reproduced, transferred or copied, the content management function 244 causes the content database 246 to update the content information and to transmit the content information updated to the communication function 247 through the network 202.

The content management function 244 may receive from the operation instructing function 253 an instruction for the transfer or copying of the content within the content database 246. (The instructions include an instruction for the transfer or copying of the content from the personal computer 204 to the hard disc drive 205, and an instruction for the transfer or copying of the content from the hard disc drive 205 to the personal computer 204.) If this is the case, the content management function 244 asks the copyright management function 245 whether the transfer or copying of the content is permitted or not. If it is determined that the transfer or copying is permitted, from the usage conditions that are recorded in the content database 246, the content management function 244 causes the content database 246 to transfer or copy the content. The content management function 244 instructs the copyright management function 245 to update the usage conditions of both the data source and the data destination.

The content management function 244 may receive from the server 201 an instruction for the transfer or copying of the content within the content database 246. (These instructions include an instruction for the transfer or copying of the content from the personal computer 204 to the hard disc drive 205, and an instruction for the transfer or copying of the content from the hard disc drive 205 to the personal computer 204.) In this case, the content management function 244 asks the copyright management function 245 whether the transfer or copying of the content is permitted or not. If it is determined that the transfer or copying is permitted, from the usage conditions that are recorded in the content database 246, the content management function 244 causes the content database 246 to transfer or copy the content. The content management function 244 instructs the copyright management function 245 to update the usage conditions of both the data source and the data destination.

If the copyright management function 245 determines that the transfer or copying of the content is not permitted, the content management function 244 will not transfer or copy the content.

The content management function 244 may receive from the operation instructing function 253 an instruction for the transfer of copying of the content from the content database 246 to the server 201. If so, the function 244 asks the copyright management function 245 if the transfer or copying of the content has been permitted. If the function 244 determines that the transfer or copying of the content has been permitted, it causes the communication function 247 to transmit the content to the server 201, along with the content ID and the file name of the destination (to which the content will be copied). The file name includes a path name.

If the copyright management function 245 determines that the transfer or copying of the content is not permitted, the content management function 244 will cause the communication function 247 not to transmit the content.

The content management function 244 may receive from the operation instructing function 253 an instruction for the transfer or copying of the content from the content database 246 to the PDA 203. If this is the case, the function 244 asks the copyright management function 245 if the transfer or copying of the content has been permitted. If the function 245 determines that the transfer or copying of the content has been permitted, the content management function 244 causes the communication function 247 to transmit the content to the PDA 203.

The content is transmitted, along with the content ID and the file name of the destination (to which the content will be copied). It should be noted that the file name includes a path name.

If the copyright management function 245 determines that the transfer or copying of the content has not been permitted, the content management function 244 will not transmit the content to the content management function 244.

When the communication function 247 receives a request for the transfer or copying of the content from the content database 246 to the server 201, the content management function 244 asks the copyright management function 245 whether the transfer or copying of the content is permitted or not. If the function 245 determines that the transfer or copying of the content is permitted, the content management function 244 causes the communication function 247 to transmit the content, along with the content ID and the file name of the destination (to which the content will be copied). The file name includes a path name.

If the function 245 determines that the transfer or copying of the content is not permitted, the content management function 244 causes the communication function 247 not to transmit the content.

When the communication function 247 may receive from the server 201 an instructions for the transfer or copying of the content from the content database 246 to the PDA 203. In this case, the content management function 244 asks the copyright management function 245 whether the transfer or copying of the content is permitted or not. If the copyright management function 245 determines that the transfer or copying is permitted, the content management function 244 causes the communication database 247 to transmit the content to the PDA 203. The content is transmitted, along with the content ID and the file name of the destination (to which the content will be copied). Note that the file name includes a path name.

If the copyright management function 245 determines that the transfer or copying is not permitted, the content management function 244 causes the communication function 247 not to transmit the content.

Assume that the communication function 247 receives an instruction for the transfer or copying of the content to the personal computer 204. Then, the content management function 244 causes the content database 246 to record the content received and instructs the copyright management function 245 to update the usage conditions of the content received.

In accordance with the usage conditions of the content, the copyright management function 245 allows or inhibits the content recorded in the content database 246, from being reproduced, transferred or copied. When the content are reproduced, transferred or copied, the function 245 causes the content database 246 to update the usage conditions of the content.

The content database 246 records the content, content ID, content information, content usage conditions and content key, in the form of a single file of directory structure.

The communication function 247 receives the content or the content information that has been transmitted from the server 201 or the PDA 203 through the network 202. The communication function 247 transmits the content or the content information to the server 201 or the PDA 203 through the network 202.

The PDA 203 has the same structure as the personal computer 204. Therefore, the structure of the PDA 203 is not described herein.

FIG. 22 is a diagram illustrating an example of the content information that is recorded in the content database 224 of the server 201, the content database 246 of the personal computer 204, or the content database of the PDA 203.

The content information comprises various data items. The data items include a device connected, a content ID, a device ID, a device name, connection data, additional data, usage conditions, a file name, and display data. The device connected is the ID of a device which records the content and which is connected to the server 201.

The connection data represents whether or not the sever 201 is connected to the device that records the content. If the connection data is "TRUE," the device is connected to the server 201. If the connection data is "FALSE," the device is not connected to the server 201.

The device name is the name of the device which records the content and which corresponds to the device ID. The user may give any desirable name to the device.

The additional data includes the name of content, the recording date of content, and the type of content.

The usage condition includes an authorized user, a copy count, a transfer count, and a reproduction count. The authorized user may be the user ID that identifies the user. The user ID may be used as a usage condition, along the name of the user.

The file name contains a so-called "path."

The display data includes an artist name, a release date, and an album name.

In the content information of FIG. 22, the content identified with the content ID "0001" is recorded in the server 201 identified by the device ID "0001." The name of content is "music A." The recording date of content identified with the content ID "0001" is 2000/1/15. The content identified with the content ID "0001" are encoded by MP3 (MPEG audio layer-3) system. Therefore, the device ID associated with the content ID "0001" is "0001," the name of content, associated with the content ID "0001," is "music A," the recording date of content, associated with the content ID "0001," is 2000/1/15, and the type of content, associated with the content ID "0001," is "mp3."

In the content information of FIG. 22, too, the server 201 identified with the device ID "0001" has the device name "server."

Since the content having the content ID "0001" is recorded in the server 201, the connection data associated with the content ID "0001" is "TRUE." Since the content having the content ID "0001" is recorded in the server 201, the device connected, which is associated with the content ID "0001," is "null."

The user authorized to use the content identified with the content ID "0001" is "Paul." Therefore, Paul can use the content identified with the content ID "0001." Since the copy count for the content identified with the content ID "0001," i.e., the number of times the content ID "0001" can be copied, is "0," the content cannot be copied at all.

The transfer count for the content identified with the content ID "0001," i.e., the number of times the content can be transferred, is "3." Therefore, the content ID "0001" can be transferred three times. Since the reproduction count for the content identified with the content ID "0001," i.e., the number of times the content can be copied, is "10," the content ID "0001" can be reproduced ten times.

The content identified with the content ID "0001" is recorded in the file having the name "audio1" that is recorded in the directory the path of which is ¥ROOT ¥AUDIO. Hence, the file name associated with the content ID "0001" is "¥ROOT ¥AUDIO ¥audio1."

The display data associated with the content ID "0001" includes an artist name "aaa" and a release date "bbb."

In the content information of FIG. 22, the content identified with the content ID "0002" and recorded in the personal computer 204 that is identified with the device ID "0002" has the content name "music B." The recording date of the content identified with content ID "0002" is 2000/2/5. Further, the content identified with content ID "0002" is encoded by MP3 system. Therefore, the device ID associated with the content ID "0002" is "0002," the name of content, associated with the content ID "0002," is "music B," the recording date of content, associated with the content ID "0002," is 2000/2/5, and the type of content, associated with the content ID "0002," is "mp3."

In the content information of FIG. 22, the personal computer 204 the device ID of which is "0002" has the device name "PC."

The personal computer 204 that records the content having the content ID of "0002" is connected to the server 201. Hence, the connection data associated with the content ID "0002" is "TRUE." Since the personal computer 204 that records the content having the content ID of "0002" is connected to the server 201, the connected device associated with the content ID "0002" has the device ID of "0001," which is the server 201.

Since the user authorized to use the content the content ID of which is "0002" is "Paul," Paul can use the content identified by the content ID "0002." Since the number of times the content identified by the content ID "0002" can be copied is "0," these content cannot be copied at all.

Since the number of times the content identified by the content ID "0002" can be transferred is "3," these content can be transferred three times. Since the number of times the content identified by the content ID "0002" can be reproduced is "10," the content can be reproduced ten times.

The content identified with the content ID "0002" is recorded in the file having the name "audio2" that is recorded in the directory the path of which is ¥ROOT ¥AUDIO. Hence, the file name associated with the content ID "0002" is "¥ROOT ¥AUDIO ¥audio2."

The display data associated with the content ID "0002" includes an artist name "ccc" and a release date "ddd."

In the content information of FIG. 22, the content identified with the content ID "0003" and recorded in the personal computer 204 that is identified with the device ID "0002" has the content name "image C." The recording date of the content identified with content ID "0003" is 2000/8/30. Further, the content identified with content ID "0003" is encoded by JPEG (Joint Photographic Experts Group) system. Therefore, the device ID associated with the content ID "0003" is "0002," the name of content, associated with the content ID "0003," is "image C," the recording date of content, associated with the content ID "0003," is 2000/8/30, and the type of content, associated with the content ID "0003," is "jpeg."

The personal computer 204 that records the content having the content ID of "0003" is connected to the server 201. Hence, the connection data associated with the content ID "0003" is "TRUE." Since the personal computer 204 that records the content having the content ID of "0003" is connected to the server 201, the connected device associated with the content ID "0003" has the device ID of "0001." Thus, this device is the server 201.

Since the user authorized to use the content the content ID of which is "0003" is "Paul," Paul can use the content identified by the content ID "0003." Since the number of times the content identified by the content ID "0003" can be copied is "1," these content can be copied once.

Since the number of times the content identified by the content ID "0003" can be transferred is "3," these content can be transferred three times. Since the number of times the content identified by the content ID "0003" can be reproduced is "10," the content can be reproduced ten times.

The content identified with the content ID "0003" is recorded in the file having the name "image1" that is recorded in the directory the path of which is \ROOT \IMAGE. Hence, the file name associated with the content ID "0003" is "\ROOT \IMAGE \image1."

The display data associated with the content ID "0003" includes an artist name "eee" and a release date "fff."

In the content information of FIG. 22, the content identified with the content ID "0004" and recorded in the hard disc drive 205 that is identified with the device ID "0003" has the content name "music D." The recording date of the content identified with content ID "0004" is 2000/9/15. Further, the content identified with content ID "0004" is encoded by ATRAC (Adaptive Transform Acoustic Coding)-3(trade name), system. Therefore, the device ID associated with the content ID "0004" is "0003," the name of content, associated with the content ID "0004," is "music D," the recording date of content, associated with the content ID "0004," is 2000/9/15, and the type of content, associated with the content ID "0004," is "at3."

In the content information of FIG. 22, the hard disc drive 205 the device ID of which is "0003" has a device name of "hard disc drive."

The hard disc drive 205 that records the content having the content ID of "0004" is connected to the server 201 by the personal computer 204. Hence, the connection data associated with the content ID "0004" is "TRUE." Since the hard disc drive 205 that records the content having the content ID of "0004" is connected to the server 201 by the personal computer 204, the connected device associated with the content ID "0004" has the device ID of "0002," which is the personal computer 204.

Since the user authorized to use the content the content ID of which is "0004" is "Kevin," Kevin can use the content identified by the content ID "0004." Since the number of times the content identified by the content ID "0004" can be copied is "2," these content cant be copied twice.

Since the number of times the content identified by the content ID "0004" can be transferred is "2," these content can be transferred twice. Since the number of times the content identified by the content ID "0004" can be reproduced is "20," the content can be reproduced 20 times.

The content identified with the content ID "0004" is recorded in the file having the name "audio3" that is recorded in the directory the path of which is \ROOT \AUDIO. Hence, the file name associated with the content ID "0004" is "\ROOT \AUDIO \audio3."

The display data associated with the content ID "0004" includes an artist name "ggg" and a release date "hhh."

In the content information of FIG. 22, the content identified with the content ID "0005" and recorded in the PDA 203 that is identified with the device ID "0004" has the content name "image E." The recording date of the content identified with content ID "0005" is 2000/6/1. Further, the content identified with content ID "0005" is encoded by GIF (Graphic Interchange Format) system. Therefore, the device ID associated with the content ID "0005" is "0004," the name of content, associated with the content ID "0005," is "image E," the recording date of content, associated with the content ID "0005," is 2000/6/1, and the type of content, associated with the content ID "0005," is "gif."

In the content information of FIG. 22, the PDA 203 whose device ID is "0004" has a device name of "PDA."

The PDA 203 that records the content having the content ID of "0005" is not connected to the server 201. Hence, the connection data associated with the content ID "0005" is "FALSE." Since the PDA 203 that records the content having the content ID of "0005" was connected to the server 201, the connected device associated with the content ID "0005" has the device ID of "0001," which is the server 201.

Since the user authorized to use the content the content ID of which is "0005" is "Jamie," Jamie can use the content identified by the content ID "0005." Since the number of times the content identified by the content ID "0005" can be copied is "5," these content can be copied five times.

Since the number of times the content identified by the content ID "0005" can be transferred is "4," these content can be transferred four times. Since the number of times the content identified by the content ID "0005" can be reproduced is "50," the content can be reproduced 50 times.

The content identified with the content ID "0005" is recorded in the file having the name "image2" that is recorded in the directory the path of which is \ROOT \IMAGE . Hence, the file name associated with the content ID "0005" is "\ROOT \IMAGE \image2."

The display data associated with the content ID "0005" includes an artist name "iii" and a release date "jjj."

Figure 23:
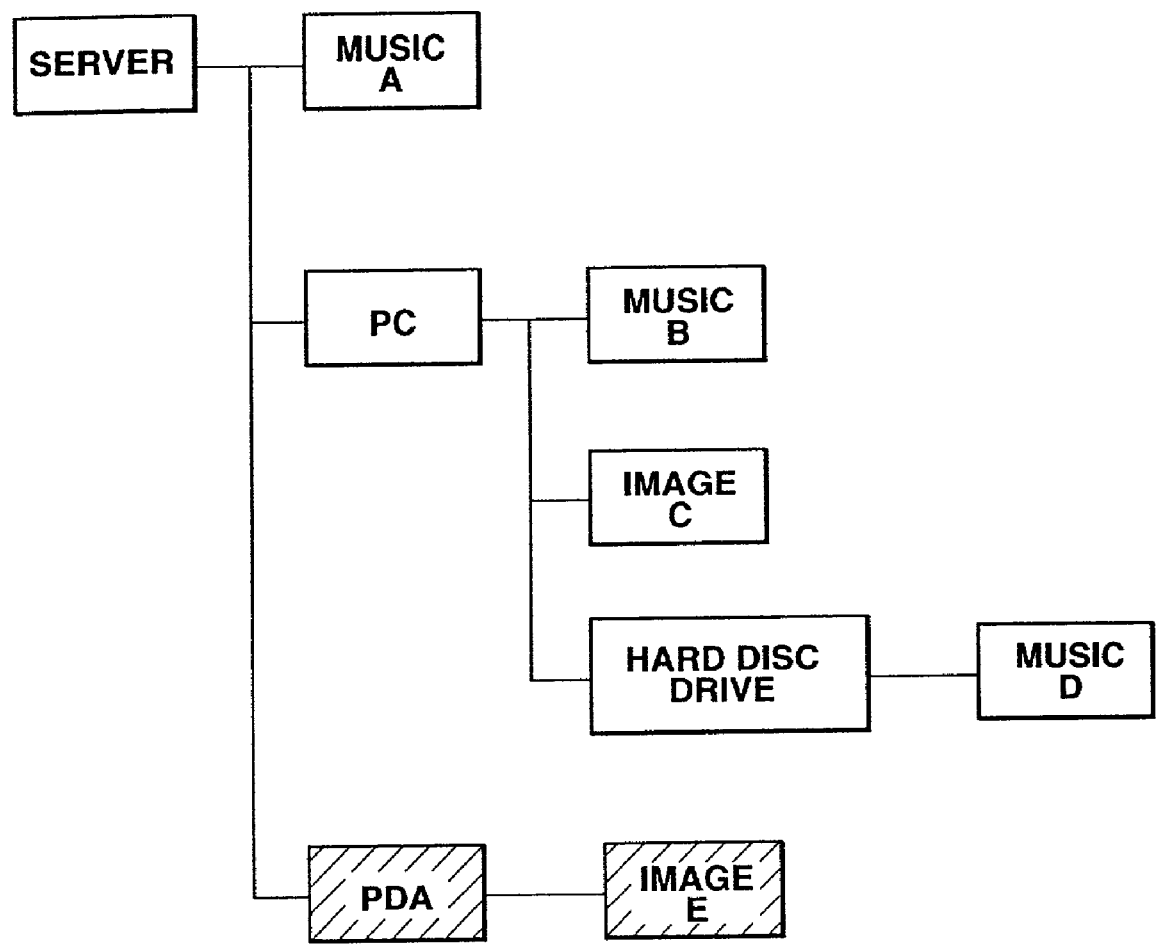
FIG. 23 is an image the personal computer 204 displays.

FIG. 23 is an image the personal computer 204 displays upon receiving the content information shown in FIG. 22.

As FIG. 23 shows, the server 201, which is the root, records the content "music A." The personal computer 204 and the PDA 203 are connected to the server 201. Therefore, the icons of the content "music A," personal computer 204 and PDA 203 are arranged on the right of the icon of the server 201.

The personal computer 204 records the content "music B" and the content "image C." The hard disc drive 205 is connected to the personal computer 204. Therefore, the icons of the contents "music B" and "image C" and the icon of the hard disc drive 205 are arranged on the right of the icon of the personal computer 204.

The hard disc drive 205 records the content "music D." Thus, the icon of the content "music D" is arranged on the right of the icon of the hard disc drive 205.

The PDA 203 records the content "image E." Therefore, the icon of the content "image E" is arranged on the right of the icon of the PDA 203.

The PDA 203 is not connected to the server 201. Thus, the icon of the PDA 203 and the icon of the content "image E" are displayed in a color different from the icon of the content "music A." This indicates that the PDA 203 recorded the content "image E" when it was connected to the server 201.

Figure 24:
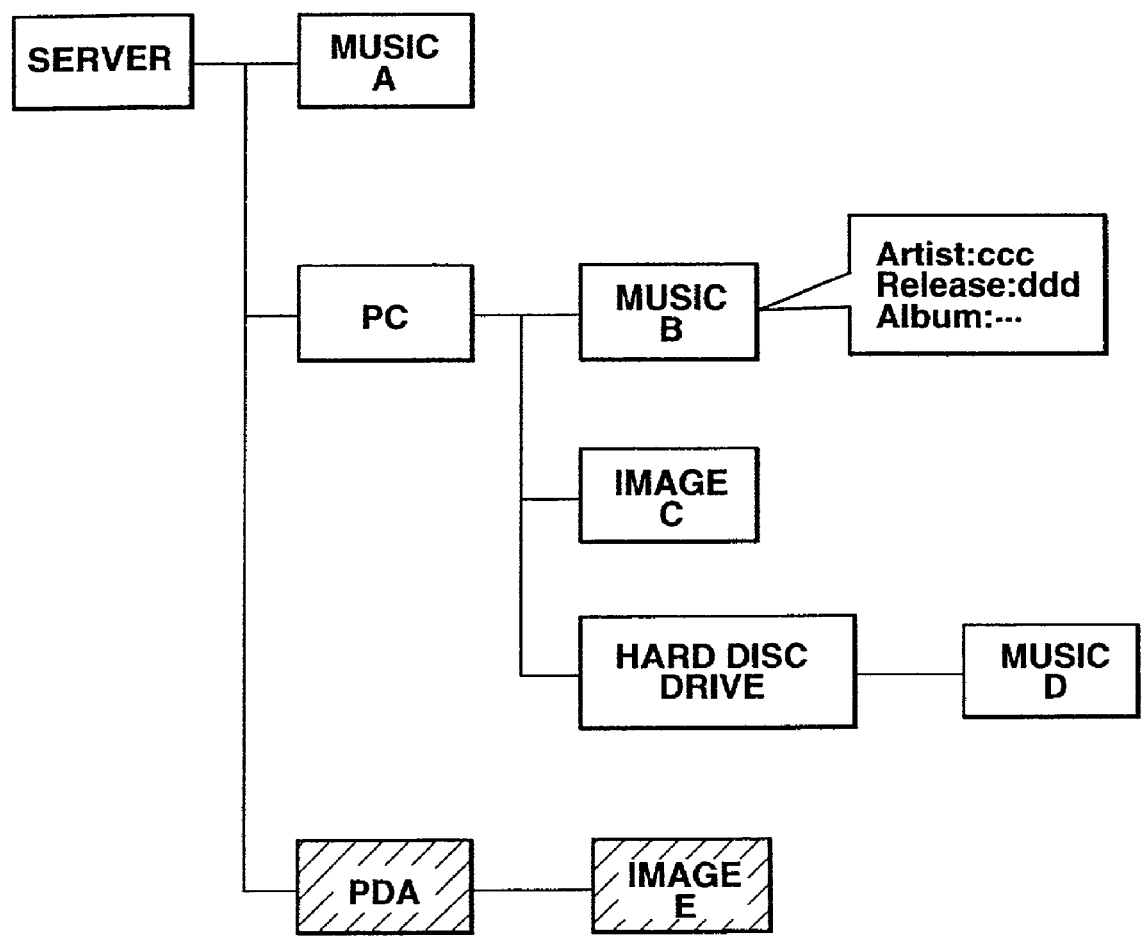
FIG. 24 is another image the personal computer 204 displays.

The icon of the content "music B," for example, may be clicked as shown in FIG. 24. In this case, the personal computer 204 displays the artist name "ccc" and the release date "ddd," both associated with the content "music B."

The personal computer 204 may display usage conditions of a content when the icon of this content is clicked.

The user may drag the icon of the content "image C" and then drop it at the icon of the hard disc drive 205. If this is the case, the personal computer 204 will transfer the content "image C" to the hard disc drive 205.

When the personal computer 204 transfers the content "image C" to the hard disc drive 205, it updates the content information. The content information updated is supplied to the server 201.

The server 201 updates the content information it records, based on the content information received from the personal computer 204. The content information thus updated is supplied to the personal computer 204.

FIG. 25 is the content information that the personal computer 204 displays when the content "image C" is transferred to the hard disc drive 205.

Since the content "image C" identified with the content ID "0003" has been transferred to the hard disc drive 205, the device ID associated with the content ID "0003" is "0003," identifying the hard disc drive 205, and the device name associated with the content ID "0003" is "hard disc drive."

The device connected, which is associated with the content ID "0003," is "0002," which designates the personal computer 204.

Figure 26:
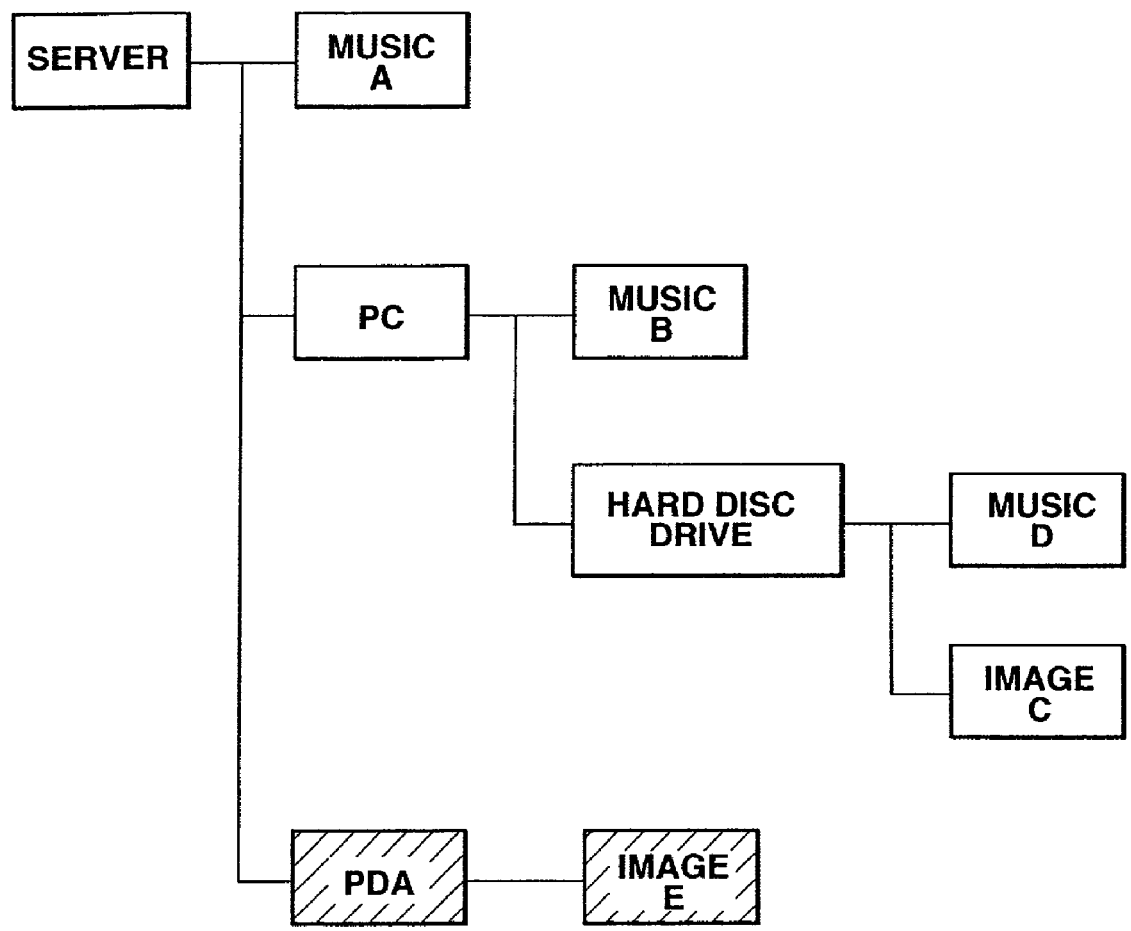
FIG. 26 is another image the personal computer 204 displays.

The personal computer 204 receives the content information updated when the content "image C" is transferred. At this time the personal computer 204 arranges the icons of the content "music D" and content "image C" at the right of the icon of the hard disc drive 205, as is illustrated FIG. 26.

Figure 27:
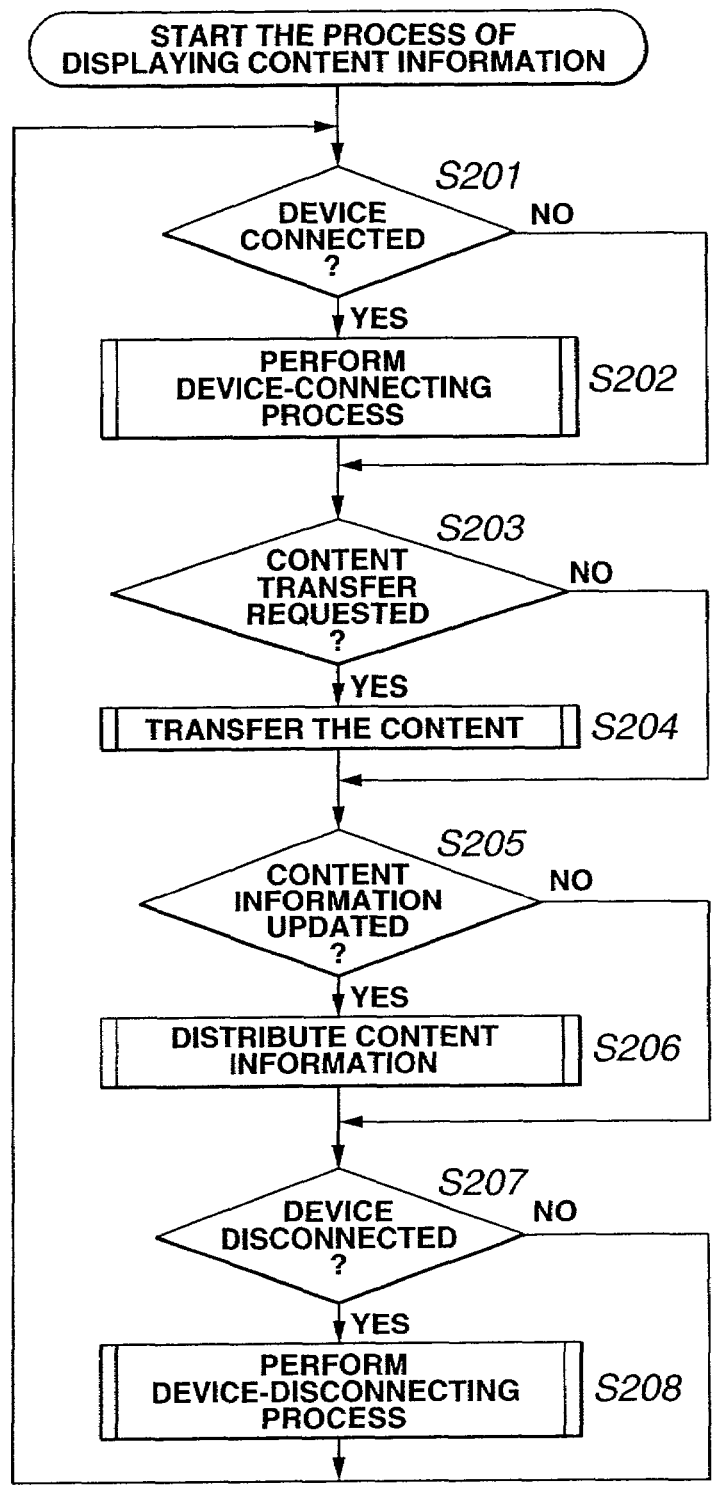
FIG. 27 is a flowchart explaining the process of displaying the content data.

How the content display system that has the structure of FIG. 19 displays the content information will be described, with reference to the flowchart of FIG. 27.

In Step S201, the server 201 determines via the network 202 whether a device such as the PDA 203 or the personal computer 204 has been connected to it. If the server 201 determines that a device has been connected to it, the operation goes to Step S202. In Step S202, a device-connecting process is performed. The device-connecting process will be described later in detail.

If the server 201 determines that a device has not been connected to it, the operation jumps to Step S203, skipping Step S202. This is because the device-connecting process need not be carried out.

In Step S203, the server 201, the PDA 203 or the personal computer 204 determines whether the transfer of a content has been requested. If it is determined that the transfer of a content has been requested, the operation goes to Step S204. In Step S204, the server 201, the PDA 203 or the personal computer 204 transfers the content. When the server 201 transfers the content, it updates the content information. How the server 201 updates the content information will be explained later in detail.

If it is determined in Step S203 that the transfer of a content has not been requested, the operation jumps to Step S205, skipping Step S204. This is because the content need not be transferred at all.

In Step S205, the server 201 determines whether the content information has been updated. If the content information is determined to have been updated, the operation goes to step S206. In Step S206, the server 201 distributes the content information to the PDA 203 and the personal computer 204. The PDA 203 and the personal computer 204 display the image corresponding to the content information. How the server 201 distributes the content information will be described later in detail.

If it is determined in Step S205 that the content information has not been updated, the operation jumps to Step S207, skipping Step S206. This is because the content information need not be distributed at all.

In Step S207, the server 201 determines whether a device such as the PDA 203 or the personal computer 204 has been disconnected from it. If the device is determined to have been disconnected, the operation advances to Step S208. In Step S208, a device-disconnecting process is performed. Then, the operation returns to Step S201, and Steps S201 to S208 will be repeated.

If it is determined in Step S207 that the device has been disconnected, the operation returns to Step S201. This is because the device-disconnecting process need not be carried out.

In the content display system shown in FIG. 19, the content is transferred whenever the transfer of the content is requested. The content information is distributed whenever the content information is updated. When the content is transferred to them, the PDA 203 and the personal computer 204 display the information about the content, based on the content information that has been updated.

In the content display system, the content may be not only transferred, but also reproduced, copied and deleted. Whenever the state of the content changes, the content information may be updated, and the content information thus updated may be distributed.

Figure 28:
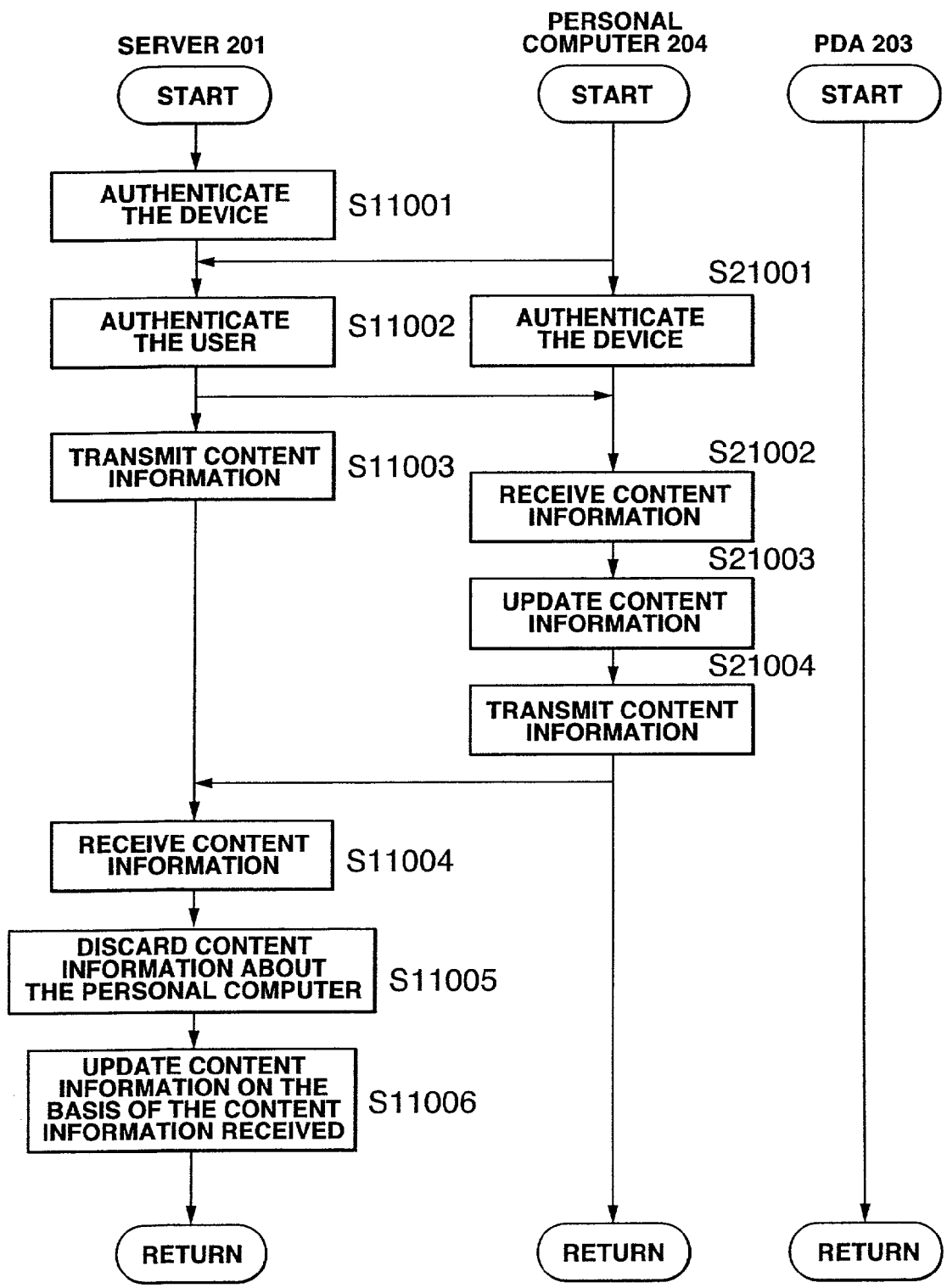
FIG. 28 is a flowchart describing the process of connecting a musical instrument.

The device-connecting process is effected in Step S202 when the personal computer 204 is connected to the server 201. How the process is performed will be described with reference to the flowchart of FIG. 28.

In Step S11001, the authentication function 221 provided in the server 201 authenticates the personal computer 204 by the challenge-and-response method or the like. If the personal computer 204 is not authenticated as one that can be connected, the device-connecting process is terminated and will not be performed on the personal computer 204.

In Step S21001, the authentication function 241 provided in the personal computer 204 authenticates the server 201. If the server 201 is not authenticated as one that can be connected, the device-connecting process is terminated. The content information is not updated.

In Step S 11001 the personal computer 204 may be authenticated as one that can be connected, and in Step S21001 the server 201 may be authenticated as one that can be connected. If this is the case, the operation goes to Step S11002. In Step S11002, the authenticate function 221 of the server 201 authenticate the user of the personal computer 204, based on the information supplied from the personal computer 204. If the function 221 does not authenticate the user of the personal computer 204 as an authorized user, the process is terminated, and the content information will not be updated.

If the user of the personal computer 204 may be found an authorized one in Step S11002, the process goes to Step S11003. In Step S11003, the content management function 222 of the server 201 reads content information from the content database 224. The communication function 225 transmits the content information, thus read, to the personal computer 204 through the network 202.

In Step S21002, the communication function 247 of the personal computer 204 receives the content information transmitted from the server 201. In Step S21003, the content management function 244 of the personal computer 204 updates the content information stored in the content database 246, based on the content information the computer 204 has received from the server 201.

In Step S21004, the content management function 244 of the personal computer 204 reads the content information from the content database 246. The communication function 247 transmits the content information, thus read, to the server 201 through the network 202.

In Step S11004, the communication function 225 of the server 201 receives the content information transmitted from the personal computer 204. In Step S11005, the content management function 222 discards the content information about the computer 204 from the content database 224.

In Step S11006, the content management 222 updates the content information stored in the content database 224, based on the content information received from the personal computer 204. The process is then terminated.

Thus, the content information recorded in the server 201 is updated when any device is connected to the server 201, and the content information recorded in the device is also updated when it is connected to the server 201.

Figure 29:
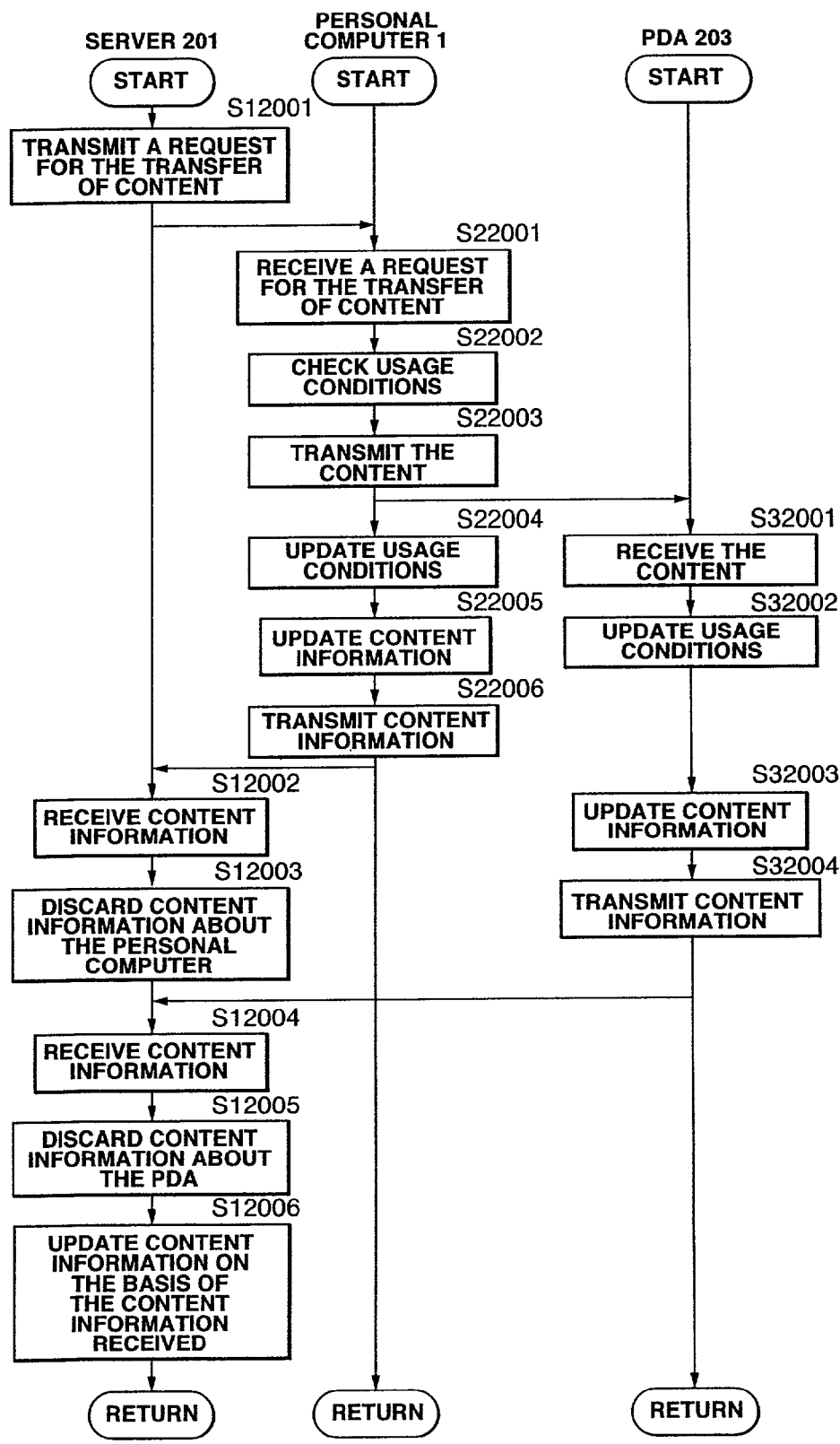
FIG. 29 is a flowchart describing the process of moving the content.

The user of the PDA 203 may drag the icon of the content, displayed on the PDA 203 and drop it at the icon of the server 201, requesting that the content be transferred from the PDA 203 to the server 201. In this case, the personal computer 204 transfers the content to the PDA 203 in Step S204, as will be described with reference to the flowchart of FIG. 29.

In Step S12001, the communication function 225 of the server 201 transmits a request for the transfer of the content to the personal computer 204 via the network 202.

In Step S22001, the communication function 247 of the personal computer 204 receives the request for the transfer of the content. In Step S22002, the copyright management function 245 of the personal computer 204 checks the usage conditions for the content, which are recorded in the content database 246 of the personal computer 204. If none of the usage conditions allow the transfer of the content, the content is not transferred and the process is terminated. If any one of the usage conditions allows the transfer of the content, the operation goes to Step S22003. In Step S22003, the content management function 244 of the personal computer 204 reads the content from the content database 246 of the personal computer 204. The communication function 247 transmits the content to the PAD 2.

In Step S32001, the communication function of the PDA 203 receives the content. In Step S32002, the copyright management function of the PDA 203 updates the usage conditions in accordance with the content the PDA 203 has received.

In Step S22004, the copyright management function 245 of the personal computer 204 updates the usage conditions stored in the content database 246 and associated with the content transmitted to the PDA 203. In Step S22005, the content management function 244 of the personal computer 204 updates the content information about the content transmitted to the PDA 203. In Step S22006, the content management function 244 causes the communication function 247 to transmit the content information to the server 201 through the network 202.

In Step S12002, the communication function 225 of the sever 201 receives the content information transmitted from the personal computer 204. In Step S12003, the content management function 222 discards the content information about the personal computer 204 from the content database 224.

In Step S32003, the content management function of the PDA 203 updates the content information in accordance with the content that the PDA 203 has received.

In Step S32004, the communication function of the PDA 203 transmits the content information to the server 201 through the network 202.

In Step S12004, the communication function 225 of the server 201 receives the content information the content information transmitted from the PDA 203. In Step S12005, the content management function 222 discards the content information about the PDA 203 from the content database 224.

In Step S12006, the content management function 222 of the server 201 updates the content information stored in the content database 224, based on the content information received from the personal computer 204 and the content information received from the PDA 203. The process is then terminated Thus, the server 201, the personal computer 204 and the PDA 203 can transfer the content and update the content information associated with the content transferred.

The content can be transferred from the PDA 203 to the personal computer 204 in the same manner as has been described. Therefore, how the content is so transferred will not be described.

Figure 30:
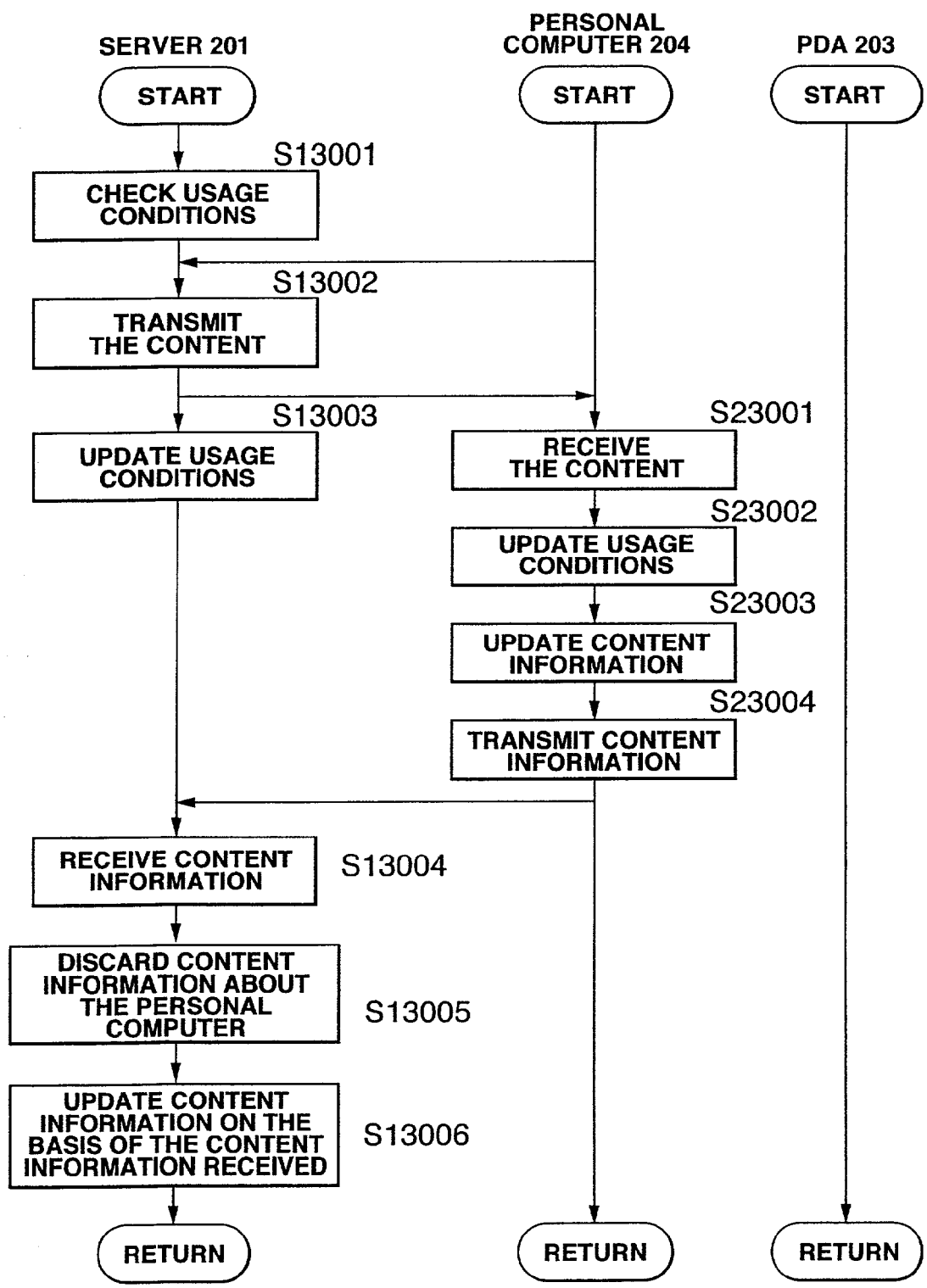
FIG. 30 is another flowchart explaining the process of moving the content.

The user of the personal computer 204 may drag the icon of the content, displayed on the display and drop it at the icon of the server 201, requesting that the content be transferred from the server 201 to the personal computer 204. In this case, the content is transferred from the server 201 to the personal computer 204 in Step S204, as will be described with reference to the flowchart of FIG. 30.

In Step S13001, the copyright management function 223 of the server 201 checks the usage conditions for the content, which are recorded in the content database 224 of the server 201. If none of the usage conditions allow the transfer of the content, the content is not transferred and the process is terminated. If any one of the usage conditions allows the transfer of the content, the operation goes to Step S13002. In Step S13002, the content management function 222 of the server 201 reads the content from the content database 224 of the sever 201. The communication function 225 transmits the content to the personal computer 204.

In Step S13003, the copyright management function 223 of the server 201 updates the usage conditions associated with the content and stored in the content database 224 of the sever 201.

In Step S23001, the communication function 247 of the personal computer 204 receives the content. In Step S23002, the copyright management function 245 of the computer 204 updates the usage conditions associated with the content, in the content database 246 of the server 201.

In Step S23003, the content management function 244 of the personal computer 204 updates the content information stored in the content database 246, in accordance with the content received. In Step S23004, the communication function 247 of the personal computer 204 transmits the content information to the server 201 through the network 202.

In Step S13004, the communication function 225 of the server 201 receives the content information transmitted from the personal computer 204. In Step S13005, the content management function 222 discards the content information about the personal computer 204 from the content database 224.

In Step S13006, the content management function 222 of the sever 201 updates the content information stored in the content database 224, based on the content information received from the personal computer 204. The process is then terminated.

Thus, the server 201 and the personal computer 204 can transfer the content and update the content information associated with the content transferred.

The content can be transferred from the server 201 to the PDA 203, from the personal computer 204 to the server 201, and from the PDA 203 to the server 201, in the same way. How the content is so transferred will not be described.

Figure 31:
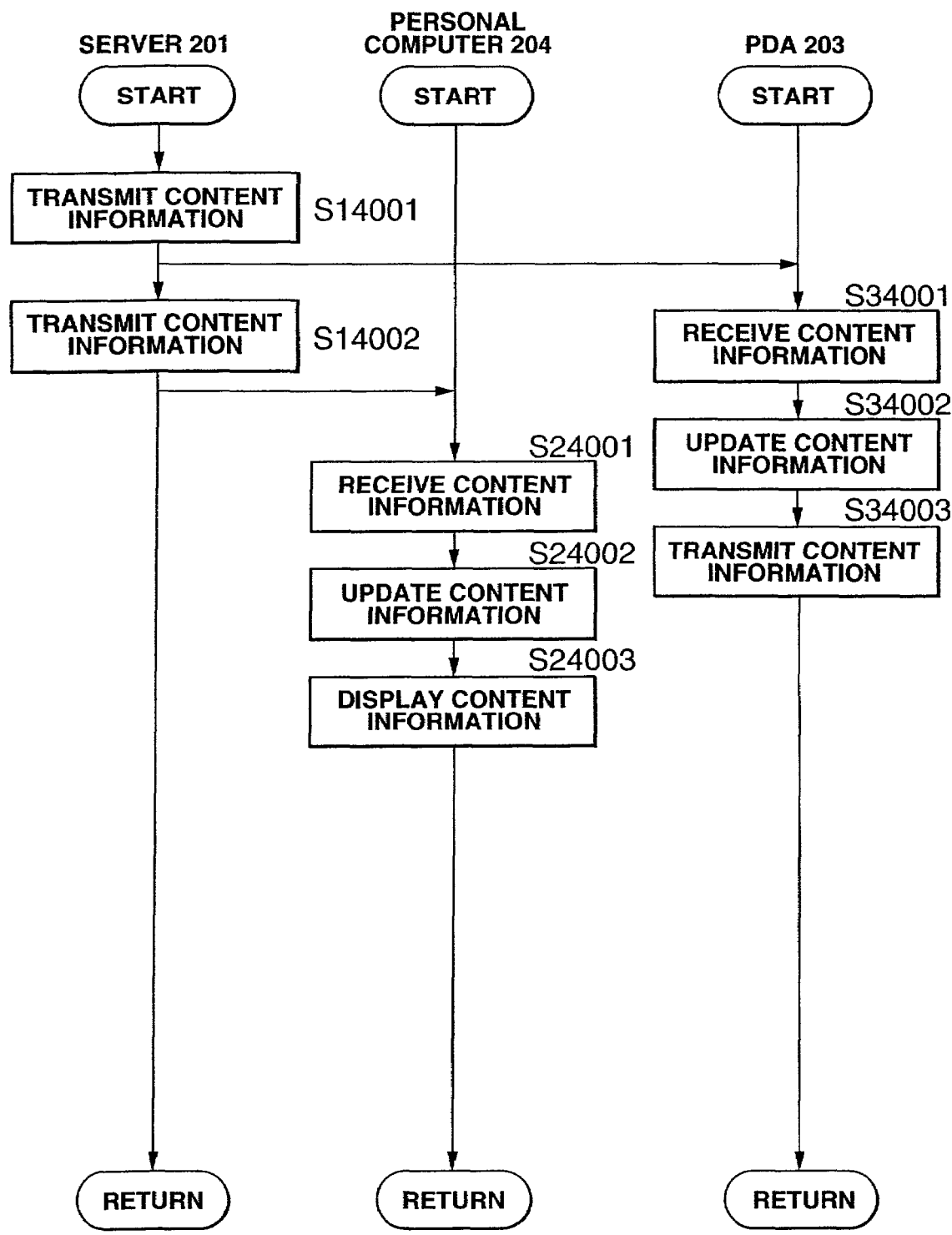
FIG. 31 is a flowchart describing the process of distributing the content data.

How the content information is distributed in Step S206 (FIG. 27) when the content information is updated will be described, with reference to the flowchart of FIG. 31.

In Step S14001, the communication function 225 of the server 201 transmits the content information to the PDA 203 through the network 202.

In Step S34001, the communication function of the PDA 203 receives the content information transmitted from the sever 201. In Step S34002, the content management function of the PDA 203 updates the content information stored in the PDA 203, in accordance with the content information received. In Step S34003, the content display function of the PDA 203 displays the content information updated.

In Step S14002, the communication function 225 of the server 201 transmits the content information to the personal computer 204 through the network 202.

In Step S24001, the communication function 247 of the personal computer 204 receives the content information transmitted from the server 201. In Step S24002, the content management function 244 of the personal computer 204 updates the content information stored in the computer 204, in accordance with the content information received. In Step S24003, the content display function 242 of the personal computer 204 displays the content information updated. The process is then terminated.

Thus, the content information is distributed to any device connected to the server 201, when the content information is updated.

Assume that an N number of devices are connected to the server 201. In this case, the server 201 distributes the content information updated, to each of these devices.

Figure 32:
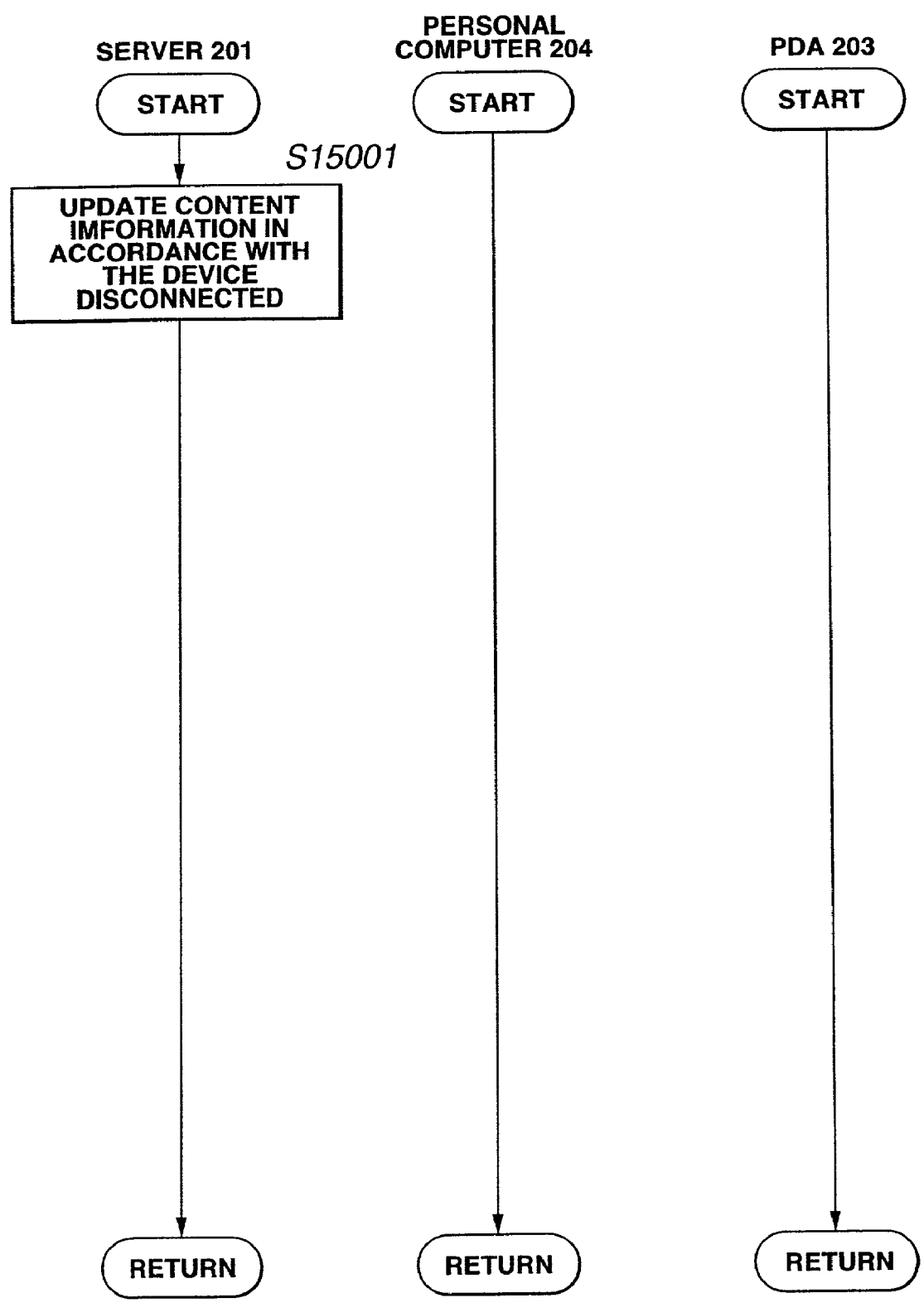
FIG. 32 is a flowchart explaining the process of disconnecting the musical instrument.

How the device-disconnection process is performed in Step S208 (FIG. 27) will be explained, with reference to the flowchart of FIG. 32.

In Step S15001, the content management function 222 of the server 201 updates the content information in the content database 224, setting the connection flag at "false." Then, the process is terminated. Note that the flag is concerned with the content of the device disconnected from the server 201.

When the personal computer 204, for example, is disconnected from the server 201, the content management function 222 updates the content information in the content database 224, setting the connection flag at "false," which is concerned with the content stored in the personal computer 204.

Thus, the server 201 updates the connection flag contained in the content information and concerned with the content stored in the device disconnected from the server 201, when the process of displaying the content is terminated.

As described above, the server 201 is connected by the network 202 to the PDA 203 and the personal computer 204. Nonetheless, the server 201 can be connected to not only the PDA 203 and the personal computer 204, but also other types of devices. It can be connected to, for example, a mobile telephone, a PHS terminal, a digital still camera, a digital video camera, a car navigation device, a television receiver, a radio receiver, or a portable device. The server 201 operates in the same way as described above, to whichever device it is connected.

As indicated above, the server 201 is connected to the PDA 203 and the personal computer 204 by the network 202. Instead, the server 201 may be connected to the PDA 203 and the computer 204 by a wire or wireless media, such as the public telephone line, the mobile telephone line, the PHS, the Internet, the Bluetooth network, or the digital satellite broadcasting network.

Further, the content that the server 201, the PDA 203 or the personal computer 204 records is not limited to music or images. Rather, it may be voice, characters, programs or data for executing a program.

As described above, the content is encrypted by the DES system. Nonetheless, it may be encrypted into a block code or stream code of another common-key system, or into a code of a public-key system.

The sequence of operations, described above, can be performed not only by hardware, but also by software. To perform the sequence by using software, the programs constituting the software are installed from a recording medium into a dedicated computer or a general-purpose computer.

The recording medium is distributed to users to provide them with the programs. The recording medium may be a package media such as a magnetic disc 51 (including a floppy disc), an optical disc 52 (CD-ROM (Compact Disc-Read Only Memory)), a DVD (Digital Versatile Disc), a magneto-optical disc 53 (MD (Mini-Disc), or a semiconductor memory 54, as is illustrated in FIG. 2. Alternatively, the recording medium may be the ROM 22 or the hard disc provided in the recording section 29, either incorporated in the personal computer 1.

If necessary, the programs for executing the sequence of operations may be installed into the computer through an interface such as a router or a modem. Alternatively, they may be installed into the computer through a wire or wireless medium such as a local area network, the Internet or the digital satellite-broadcasting network.

The steps describing any program stored in the recording medium are performed in the time sequence specified above in the present specification. Instead, some of them may be carried out in parallel or independently of one another.

The word "system" used in this specification means an apparatus that comprises a plurality of devices.

INDUSTRIAL APPLICABILITY

According to the information providing apparatus, information providing method and recording medium of the present invention, an information processing device is authenticated via a transmission path, and the usage conditions of a content and information about the content are held. The reception of the usage condition and the information about the content is controlled. The usage condition and the information, which are held, are updated based on the usage conditions and the information received. Hence, any desired content can be retrieved quickly, and a copyrighted content can be easily transferred and copied in accordance with the usage conditions.

According to the information providing apparatus, information providing method and recording medium of the present invention, the usage conditions of a content and information about the content are held. When the content is operated the usage condition and the information held are updated. When the information providing apparatus is authenticated via the transmission path and the content is operated, the transmission of the usage condition and information is controlled. The reception of the usage conditions and information about the contents, transmitted from the information providing apparatus, is controlled. The usage conditions and the information, which are held, are updated, and the display of the information is controlled. Hence, any desired content can be retrieved quickly, and a copyrighted content can be easily transferred and copied in accordance with the usage conditions.

The invention claimed is:

1. An information processing apparatus operably linked to a device, said information processing apparatus comprising:
   a device authenticating unit configured to authenticate the device;
   a memory configured to store device information of the device and connection status information of the device and content information which is stored in the device;
   a communication unit configured to receive the device information of the device, the connection status information and content information of content from the device;
   an updating unit configured to update the device information and the connection status information of the device and the content information based on an information based on information that the communication unit received; and,
   a display control unit configured to control display of the device information and the content information; wherein the display control unit being responsive to the updating unit to reflect the updated device information and content information on a display to represent device information and content information in different ways depending on the connection status information of the device indicate whether the device is connected or not to said information processing apparatus, wherein said display controlling unit controls the display to display the content information which was stored in the device at a time of a previous connection when the connection status information indicates that the device is not connected.

2. The information processing apparatus according to claim 1, wherein the display control unit controls display of the updated device information or the updated content information in a form of tree structure.

3. The information processing apparatus according to claim 1, further comprising:
   a receiving unit configured to receive operation of the content transferred from the device to the information processing apparatus or from the information processing apparatus to the device,
   wherein the updating unit updates the content information.

4. The information processing apparatus according to claim 3, further comprising:
   an operation control configured to control operation of the content according to a usage condition corresponding to the content.

5. The information processing apparatus according to claim 1, further comprising:
   a transmitting unit configured to transmit the content information to the device; and,
   a receiving unit configured to receive the content information updated in the device from the device,
   wherein updating unit updates the device information and the content information based on the reception of the receiving unit.

6. A method of exchanging information between an information processing apparatus and operably linked device, comprising:
   storing device information of the device connection status information of the device, and, content information of the device to a memory;
   authenticating the operably linked device;

receiving the device information of the device and content information of content from the device;

updating the device information, the connection status information of the device, and content information based on information received;

controlling display of the device information and the content information on a display; and, updating the display based upon the updated information to reflect on the display the updated device information and content information to represent device information and content information in different ways depending on the connection status information of the device indicate whether the device is connected or not to said information processing apparatus, the content information stored in the device at a time of a previous connection being displayed when the connection status information indicates that the device is not connected.

7. The method according to claim 6, wherein the updated device information or the updated content information is displayed in a form of tree structure.

8. The method according to claim 6, further comprising:
transceiving the content transferred from the device to the information processing apparatus or from the information processing apparatus to the device,
updating the content information based on the transceiving.

9. The information processing apparatus according to claim 8, further comprising:
controlling the content according to a usage condition corresponding to the content.

10. The method according to claim 6, further comprising:
transmitting the content information to the device; and,
receiving the content information updated in the device from the device, wherein updating unit updates the device information and the content information is updated based on the reception.

11. A computer readable carrier including computer program instructions that cause a computer to implement a method of exchanging information between an information processing apparatus and an operably linked device, the method comprising:

storing device information of the device connection status information of the device, and, content information of the device to a memory;

authenticating the operably linked device;

receiving the device information of the device and content information of the content from the device;

updating the device information, the connection status information of the device and content information based on information received;

controlling display of the device information and the content information on a display; and, updating the display based upon the updated information to reflect on the display the updated device information and content information to represent device information and content information in different ways depending on the connection status information of the device indicate whether the device is connected or not to said information processing apparatus, the content information stored in the device at a time of a previous connection being displayed when the connection status information indicates that the device is not connected.

* * * * *